(12) United States Patent
Kanawa

(10) Patent No.: US 7,822,788 B2
(45) Date of Patent: Oct. 26, 2010

(54) METHOD, APPARATUS, AND COMPUTER PROGRAM PRODUCT FOR SEARCHING STRUCTURED DOCUMENT

(75) Inventor: Takuya Kanawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 11/896,267

(22) Filed: Aug. 30, 2007

(65) Prior Publication Data

US 2008/0082526 A1 Apr. 3, 2008

(30) Foreign Application Priority Data

Sep. 28, 2006 (JP) ............................. 2006-264835

(51) Int. Cl.
*G06F 7/00* (2006.01)
*G06F 17/30* (2006.01)
(52) U.S. Cl. ................. 707/811; 707/778; 707/791; 707/812
(58) Field of Classification Search .................. None
See application file for complete search history.

(56) References Cited

U.S. PATENT DOCUMENTS

| 6,584,459 | B1* | 6/2003 | Chang et al. | 707/812 |
|---|---|---|---|---|
| 6,853,992 | B2* | 2/2005 | Igata | 707/741 |
| 7,730,104 | B2* | 6/2010 | Uchiyama et al. | 707/802 |
| 2002/0095409 | A1* | 7/2002 | Takahashi et al. | 707/3 |
| 2003/0014424 | A1* | 1/2003 | Sokol et al. | 707/102 |
| 2003/0195873 | A1* | 10/2003 | Lewak et al. | 707/3 |
| 2005/0050038 | A1* | 3/2005 | Kobayashi et al. | 707/3 |

FOREIGN PATENT DOCUMENTS

| JP | 2001-147933 | 5/2001 |
|---|---|---|
| JP | 2002-202973 | 7/2002 |

OTHER PUBLICATIONS

Brian F. Cooper, Neal Sample, Michael J. Franklin, Gisli R. Hjaltason, Moshe Shadmon A Fast Index for Semistructured Data Proceedings of the 27th VLDB Conference Roma, Italy, 2001.*
Lee, "Query Relaxation for XML Model", University of California, Los Angeles, pp. 1-181, (2002).

* cited by examiner

*Primary Examiner*—Neveen Abel Jalil
*Assistant Examiner*—Polina Peach
(74) *Attorney, Agent, or Firm*—Finnegan, Henderson, Farabow, Garrett & Dunner, L.L.P.

(57) ABSTRACT

A condition generating unit generates a hierarchical-type search condition including a search target structure ID and a search result structure ID. A first acquiring unit acquires an object ID corresponding to the search target structure ID to which a vocabulary index is not attached. A candidate generating unit generates a candidate of the search result in which an acquired object ID is associated with the search key as a first constraint condition. A second acquiring unit acquires a search result structure ID complying with a structure constraint. A result acquiring unit acquires an object corresponding to the object ID satisfying the first constraint condition.

18 Claims, 20 Drawing Sheets

DOCUMENT ID=F1

```
E1<PATENT>
E2<HEADER>
  E3<TITLE>XMLDB</TITLE>
  E4<BODY>THIS IS A DATABASE</BODY>
  E5<KEYWORD LIST>
    E6<KEYWORD>XML</KEYWORD>
    E7<KEYWORD>DB</KEYWORD>
    </KEYWORD LIST>
  </HEADER>
E8<BODY>          E10
  E9<HEADER><TITLE>SGML</TITLE></HEADER>
  E11<CONTENT>RECENT DATABASE SYSTEM</CONTENT>
  </BODY>
  </PATENT>
```

| CONSTRAINT ID | CONSTRAINT |
|---|---|
| 1 | start-with "SGML" |
| 2 | contains "XML" |
| 3 | relation [T2;T3] |

151

152

| DOCUMENT ID | TID | ELEMENT ID | CONSTRAINT ID | PROCESS PRIORITY |
|---|---|---|---|---|
| F1 | T2 | E2 | - | 1 |
| F1 | T4 | E5 | 3 | 0.9 |
| F2 | T3 | E2 | - | 1 |

FIG.16

```
<PATENT>
E2<HEADER>
E3 <TITLE>XMLDB</TITLE>
    <BODY>THIS IS A DATABASE</BODY>
    <KEYWORD LIST>
      <KEYWORD>XML</KEYWORD>
      <KEYWORD>SGML</KEYWORD>
    </KEYWORD LIST>
  </HEADER>
  <BODY>
    <HEADER><TITLE>INTRODUCTION</TITLE></HEADER>
    <CONTENT>RECENT DATABASE SYSTEM</CONTENT>
  </BODY>
E12<HEADER>
E13 <TITLE>XML MANAGEMENT APPARATUS</TITLE>
    <BODY>THIS IS AN XML MANAGEMENT APPARATUS</BODY>
    <KEYWORD LIST>
      <KEYWORD>XML</KEYWORD>
      <KEYWORD>STRUCTURED DOCUMENT</KEYWORD>
      <KEYWORD>DATABASE</KEYWORD>
    </KEYWORD LIST>
  </HEADER>
  <BODY>
    <HEADER><TITLE>INTRODUCTION</TITLE></HEADER>
    <CONTENT>ABOUT MANAGEMENT OF XML</CONTENT>
  </BODY>
</PATENT>
```

FIG.17

| | | |
|---|---|---|
| DOCUMENT ID | F1 | F1 |
| TID | T1 | T1 |
| ELEMENT ID | E3 | E13 |
| CONSTRAINT ID | 3 | 3 |
| PROCESS PRIORITY | 0.8 | 0.8 |

FIG.21

| CONSTRAINT ID | CONSTRAINT |
|---|---|
| 1 | start-with"SGML" |
| 2 | contains"XML" |
| 3 | relation [T2,T4] |
| 4 | CONSTRAINT ID=3, relation[T1,T2] |

FIG.22

| | DOCUMENT ID | TID | ELEMENT ID | CONSTRAINT ID | PROCESS PRIORITY | |
|---|---|---|---|---|---|---|
| CANDIDATE 1 | F1 | T2 | E5 | 1 | 0.9 | 2201 |
| CANDIDATE 2 | F2 | T2 | E2 | 1 | 0.8 | |
| CANDIDATE 3 | F3 | T2 | E5 | 1 | 0.7 | 2202 |
| CANDIDATE 4 | F3 | T1 | E6 | 2 | 0.7 | |
| CANDIDATE 5 | F3 | T4 | E7 | 2 | 0.7 | |

FIG.23

//HEADER[contains(.//text(),"XML") and contains(./TITLE//text(),"SGML")]

FIG.24

RELIEVE "VALUE" CONSTRAINT REGARDING T5
(EQUIVALENT TO BELOW)→CONSTRAINT ID=1:【T5, "XML"】

//HEADER[(contains((TITLE| BODY)//text(),"XML") or .//KEYWORD/text())) and contains(./TITLE//text(),"SGML")]

↑
OBTAIN IT FROM
STRUCTURE INDEX

| CONSTRAINT ID | CONSTRAINT |
|---|---|
| 1 | contains"XML" |

FIG.29

(2) INDEX SCAN OPERATOR    "SGML"

| | | | | |
|---|---|---|---|---|
| DOCUMENT ID | F1 | F2 | F3 | F4 |
| TID | T8 | T5 | T8 | T5 |
| ELEMENT ID | E10 | E7 | E6 | E1 |

FIG.30

WHETHER THERE IS ELEMENT ID
WITH [T2, T3, T5] →[T1]

(3) STRUCTURE COLLATING OPERATOR

REMOVE IT FROM CANDIDATES
IF ANY ONE IS IDENTICAL

| F1 | F1 | F1 | F2 | F2 | F2 | F3 | F4 |
|---|---|---|---|---|---|---|---|
| T1 | T5 | T5 | T1 | T5 | T5 | T1 | T1 |
| E1 | E6 | E7 | E1 | E4 | E5 | E5 | E3 |
| × | 1 | 1 | × | 1 | 1 | 2 | 2 |
| 1 | 0.9 | 0.9 | 1 | 0.9 | 0.9 | 0.5 | 0.5 |

FIG.31
| CONSTRAINT ID | CONSTRAINT |
|---|---|
| 1 | contains"XML" |
| 2 | CONSTRAINT ID=1, relation[T1,T5] |
151
FIG.32
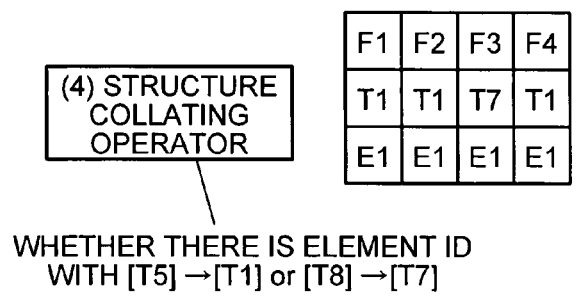
WHETHER THERE IS ELEMENT ID
WITH [T5] →[T1] or [T8] →[T7]
FIG.33
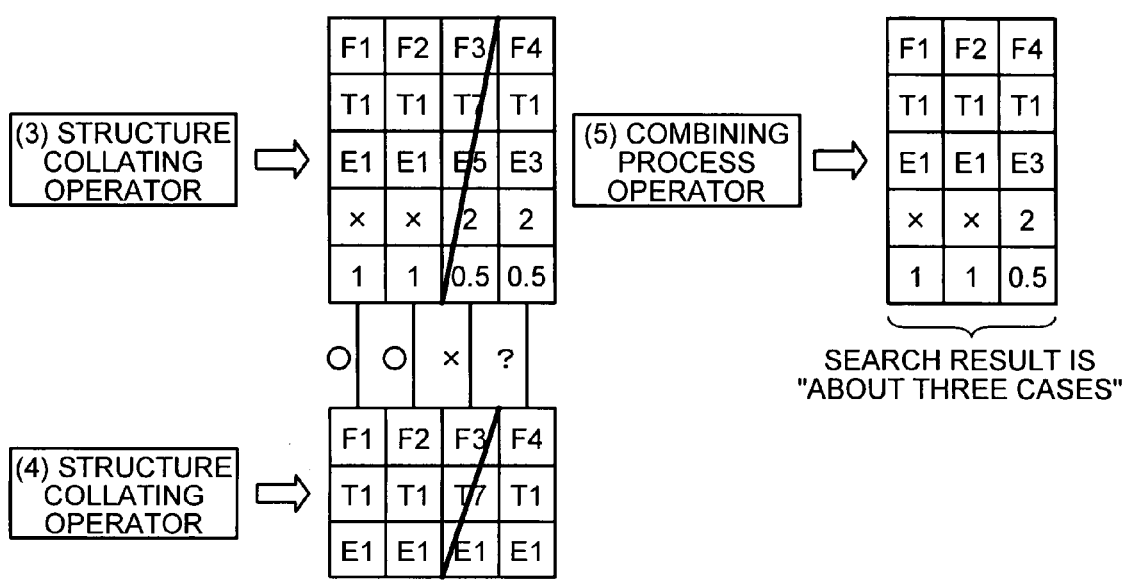
SEARCH RESULT IS
"ABOUT THREE CASES"

METHOD, APPARATUS, AND COMPUTER PROGRAM PRODUCT FOR SEARCHING STRUCTURED DOCUMENT

CROSS-REFERENCE TO RELATED APPLICATIONS

This application is based upon and claims the benefit of priority from the prior Japanese Patent Application No. 2006-264835, filed on Sep. 28, 2006; the entire contents of which are incorporated herein by reference.

BACKGROUND OF THE INVENTION

1. Field of the Invention

The present invention relates to a technology for searching a plurality of structured documents of different document structures managed in a structured-document database having a hierarchized logical structure.

2. Description of the Related Art

In recent years, a structured-document database for storing structured-document information described in extensible markup language (XML) or the like and for searching stored information has been realized. As for a query to the structured-document database, a query language called the XML query (XQuery) for which the world wide web consortium (W3C) is pushing forward a standardization has been a mainstream.

The XQuery is capable of searching information by designating a path (a structure) or a keyword (a vocabulary), with a feature of an extremely high language description capability. For instance, regarding a structure condition, the XQuery can describe a search condition in a format including a structure ambiguity using a symbol such as "/*" and "//".

In the XQuery, information at a node level in a document object model (DOM), such as an element and an attribute, becomes a search target. For instance, in JP-A 2001-147933 (KOKAI), a technology is proposed in which a search of information at a node level of a structured document is performed by following method.

First, at the time of storing a structured document in a database, a data structure of a target document is analyzed, and an index is created by embedding analysis information for the structure (the node) in vocabulary index information or the like. After that, at the time of searching information, a query graph is created by analyzing a search query, and a plan for executing a query is created after calculating a cost. Finally, the query is executed following created plan, and information of a node that satisfies a structure constraint in the query graph is obtained as a search result.

Various types of data are stored in such structured-document database, which are managed in a unified manner, and as a result, various data structures (schema) are included in the structured-document database. When processing the XQuery, it is required to search (process) a target candidate from among the data having those various schemas without omission at a high speed.

To speed up a search operation, a method of attaching a vocabulary index or a numeric index to a specific path, a method of analyzing a data structure of a storage target and extracting schema analysis information for a feature structure, and the like have been considered.

With the first method, for example, when performing a search like "/title="XML"", a speed up of the search can be expected because a reverse lookup is possible from a vocabulary by attaching a vocabulary index to a <title> tag.

With the second method, for example, a speed up of the search can be expected because a structure collating process cost for verifying that <title> is present under <header> by registering information indicating that <title> is present "by necessity" and "solely" as a child element of <header>.

In general, a portion requiring a cost in a searching process is a data collating process represented by a structure collating process, a value collating process, and the like. The value collating process is a process for verifying that a designated phrase (value) is included as a search key.

A problem in the study of a search optimization process is how to create a plan with a low cost, and a representative process requiring a high cost is the data collating process described above. The reason is because a "data scan" must be performed, in which an access is actually tried to a structured document in a database. A speed of the data scan is generally slow compared with a process with only the index.

On the other hand, in JP-A 2002-202973 (KOKAI), a technology is proposed in which a structure collating process can be execute only with an index so that a data scan can be avoided as much as possible, by setting an ID to structure information of a structured document (parent-child relation and sibling relation) in advance and attaching the ID to all index information.

However, in a technology of speeding up the search operation using the index, such as the technology proposed in JP-A 2002-202973 (KOKAI), there is a problem that a speed of a searching process is decreased when plural index types are mixed.

For instance, let us consider a case in which there are <title> and <body> as child elements of <header>, and a vocabulary index (an index of which a location can be identified from a vocabulary) is attached to <title> while the vocabulary index is not attached to <body>. In this case, if a plurality of paths, such as "/header[.//text( )="XML"]", is designated in a condition, a value collating process becomes necessary for <body> because the index is not available for <body>, resulting in a decrease of the speed of the searching process.

In addition, for instance, let us consider a case in which it is clear that <title> is included under <patent> by necessity and solely from schema analysis information analyzed at the time of registration. In this case, if a plurality of paths, such as "/header[.//text( )="XML"]", is designated in a condition, the speed of the searching process is decreased because a structure collating process is required for <body> although it is not necessary for <title>.

In other words, the speed of the overall searching process may be decreased in spite that a certain path can be processed at a high speed because a data scan is not necessary due to an availability of an index and the like, because the data scan occurs for a specific path.

In general, a searching process is executed by analyzing a search condition, determining a process order for obtaining a solution, and repeating a process of leaving an intermediate candidate that satisfies a data constraint following the process order. The above problem is caused by a fact that a constraint check is strictly performed for all candidates when obtaining the intermediate candidate.

SUMMARY OF THE INVENTION

An apparatus for searching a structured document according to one aspect of the present invention includes a structured-document storing unit that stores therein structured-document information having a hierarchized logical structure, the structured-document information including an object corresponding to a structure element and an object ID for identifying the object, the structure element being a unit of the logical structure and identified by a structure ID; a structure-index storing unit that stores therein a structure index in which the structure ID is associated with the object ID; a vocabulary-index storing unit that stores therein a vocabulary index in which a vocabulary ID for identifying a vocabulary included in the structured-document information is associated with the object ID; a structure-information storing unit that stores therein structure information on the structure element, the structure information including discrimination information indicating whether the vocabulary index is attached to the structure ID; a condition generating unit that associates a search key included in an input search condition with the structure ID that is a search target of the search key, generates a hierarchical-type search condition including, as a unit of a hierarchical structure, a search target structure ID that is a structure ID corresponding to the search key and a search result structure ID that is a structure ID to be acquired as a search result for the search condition, the hierarchical-type search condition defining a structure constraint regarding the hierarchical structure to be satisfied between the search target structure ID and the search result structure ID; a first acquiring unit that acquires, from the structure-index storing unit, the object ID corresponding to the search target structure ID that is associated with the discrimination information indicating that the vocabulary index is not attached to the structure ID from among search target structure IDs included in the hierarchical-type search condition; a candidate generating unit that associates the search key, as a first constraint condition, with the object ID acquired by the first acquiring unit, and generates a candidate of the search result including the object ID that is associated with the first constraint condition; a second acquiring unit that acquires the search result structure ID complying with the structure constraint defined in the hierarchical-type search condition, with respect to the search target structure ID corresponding to the object ID included in the candidate generated by the candidate generating unit; and a result acquiring unit that acquires, from the structured-document storing unit, the object corresponding to the object ID satisfying the first constraint condition from among object IDs corresponding to acquired search result structure IDs.

A method of searching a structured document according to another aspect of the present invention includes storing structured-document information having a hierarchized logical structure in a structured-document storing unit, the structured-document information including an object corresponding to a structure element and an object ID for identifying the object, the structure element being a unit of the logical structure and identified by a structure ID; storing a structure index, in which the structure ID is associated with the object ID, in a structure-index storing unit; storing a vocabulary index, in which a vocabulary ID for identifying a vocabulary included in the structured-document information is associated with the object ID, in a vocabulary-index storing unit; storing structure information on the structure element in a structure-information storing unit, the structure information including discrimination information indicating whether the vocabulary index is attached to the structure ID; generating, by associating a search key included in an input search condition with the structure ID that is a search target of the search key, a hierarchical-type search condition including, as a unit of a hierarchical structure, a search target structure ID that is a structure ID corresponding to the search key and a search result structure ID that is a structure ID to be acquired as a search result for the search condition, the hierarchical-type search condition defining a structure constraint regarding the hierarchical structure to be satisfied between the search target structure ID and the search result structure ID; acquiring, from the structure-index storing unit, the object ID corresponding to the search target structure ID that is associated with the discrimination information indicating that the vocabulary index is not attached to the structure ID from among search target structure IDs included in the hierarchical-type search condition; generating, by associating the search key, as a first constraint condition, with the object ID acquired at the acquiring, a candidate of the search result including the object ID that is associated with the first constraint condition; acquiring the search result structure ID complying with the structure constraint defined in the hierarchical-type search condition, with respect to the search target structure ID corresponding to the object ID included in the candidate generated at the generating; and acquiring, from the structured-document storing unit, the object corresponding to the object ID satisfying the first constraint condition from among object IDs corresponding to acquired search result structure IDs.

A computer program product according to still another aspect of the present invention includes a computer-usable medium having computer-readable program codes embodied in the medium that when executed cause a computer to execute storing structured-document information having a hierarchized logical structure in a structured-document storing unit, the structured-document information including an object corresponding to a structure element and an object ID for identifying the object, the structure element being a unit of the logical structure and identified by a structure ID; storing a structure index, in which the structure ID is associated with the object ID, in a structure-index storing unit; storing a vocabulary index, in which a vocabulary ID for identifying a vocabulary included in the structured-document information is associated with the object ID, in a vocabulary-index storing unit; storing structure information on the structure element in a structure-information storing unit, the structure information including discrimination information indicating whether the vocabulary index is attached to the structure ID; generating, by associating a search key included in an input search condition with the structure ID that is a search target of the search key, a hierarchical-type search condition including, as a unit of a hierarchical structure, a search target structure ID that is a structure ID corresponding to the search key and a search result structure ID that is a structure ID to be acquired as a search result for the search condition, the hierarchical-type search condition defining a structure constraint regarding the hierarchical structure to be satisfied between the search target structure ID and the search result structure ID; acquiring, from the structure-index storing unit, the object ID corresponding to the search target structure ID that is associated with the discrimination information indicating that the vocabulary index is not attached to the structure ID from among search target structure IDs included in the hierarchical-type search condition; generating, by associating the search key, as a first constraint condition, with the object ID acquired at the acquiring, a candidate of the search result including the object ID that is associated with the first constraint condition; acquiring the search result structure ID complying with the structure constraint defined in the hierarchical-type search condition, with respect to the search target structure ID corresponding to the object ID included in the candidate generated at the generating; and acquiring, from the structured-document storing unit, the object corresponding to the object ID satisfying the first constraint condition from among object IDs corresponding to acquired search result structure IDs.

BRIEF DESCRIPTION OF THE DRAWINGS

FIG. 16 is a schematic diagram for explaining an example of a structured document described in XML;

FIG. 17 is a schematic diagram for explaining an example of a candidate obtained by resolving a structure constraint;

FIG. 21 is a schematic diagram for explaining an example of a constraint condition;

FIG. 22 is a schematic diagram for explaining an example of an order determining method;

FIG. 23 is a schematic diagram for explaining an example of an input search condition;

FIG. 24 is a schematic diagram for explaining a relief of a value constraint;

FIG. 28 is a schematic diagram for explaining an example of a condition stored in a constraint storing unit;

FIG. 29 is a schematic diagram for explaining an example of a candidate obtained with the index scan operator;

FIG. 30 is a schematic diagram for explaining an example of a candidate obtained with a structure collating operator;

FIG. 31 is a schematic diagram for explaining an example of a condition stored in the constraint storing unit;

FIG. 32 is a schematic diagram for explaining an example of a candidate obtained with the structure collating operator;

FIG. 33 is a schematic diagram for explaining an example of a candidate obtained with a combining processing operator;

DETAILED DESCRIPTION OF THE INVENTION

Figure 1:
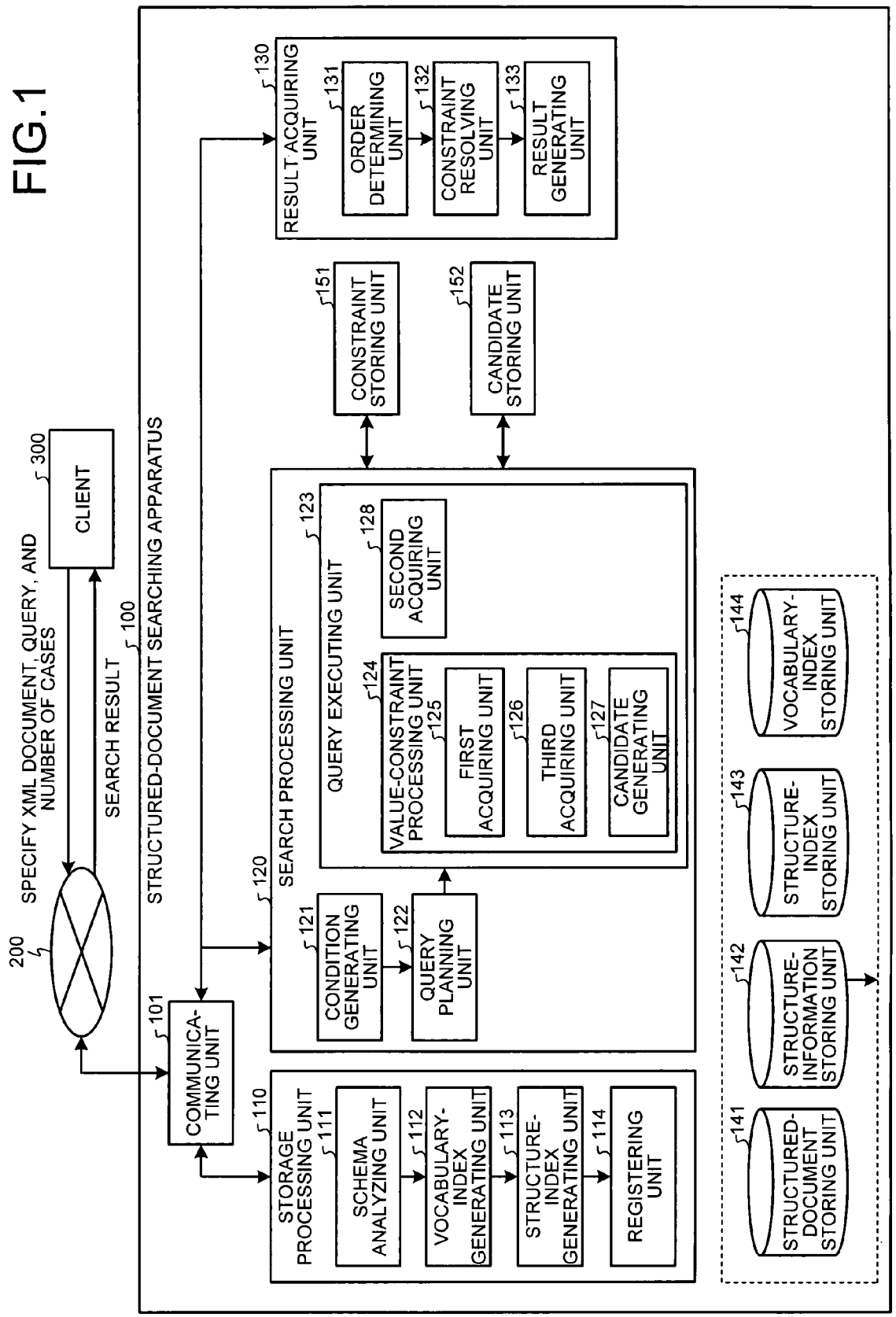
FIG. 1 is a block diagram of a structured-document searching apparatus according to an embodiment of the present invention.

Exemplary embodiments of a structured-document searching apparatus, a structured-document searching method, and a structured-document searching program according to the present invention are explained in detail below with reference to the accompanying drawings.

A structured-document searching apparatus according to an embodiment of the present invention is intended to realize speeding up of a process speed by relieving a structure constraint and a value constraint in a search condition to a constraint with which a process cost becomes low and delaying a costly process until a stage of acquiring actual data.

In other words, it is designed to skip a process for candidates that turn out to be identical as a candidate even when the constraint condition is relieved. It is because the candidate itself may become unnecessary, such as a case in which a candidate for which the constraint condition has been relieved in the middle of a process is excluded from candidates by another condition and a case in which the number of data to be acquired is designated in advance.

An outline of a structured-document searching process by the structured-document searching apparatus according to the present embodiment is described below. First, an XQuery, which is an input search condition, is analyzed, and a search plan (a query plan) is generated in such a manner that a constraint (structure and value) is relieved so that a data scan is not performed as much as possible. At this time, a process priority indicating a priority of data acquiring process is calculated from the relieved constraint (structure and value) for a candidate group for which the constraint is relieved, and the calculated process priority is attached to each value.

After that, a candidate set for which the constraint is not relieved is taken as a correct intermediate candidate, with the other candidates as a provisional candidate, and the process is advanced with candidates obtained by relieving the constraint until a stage of data acquisition. The candidates in the middle of a process are generally managed in a database by a uniquely identified object ID (OID). However, for the provisional candidate, global information, for example, not correct but rough structure information is attached. At the time of data combining, a data combining process is performed with information turned out to be clear at the time.

Finally, the constraint against the provisional candidate is only relieved at the time of acquiring actual data, and for only the ones satisfying the condition, values are taken in a concrete form as a solution. At this time, speeding up of the process speed is realized by determining an order of lifting the relieved constraint in such a manner that a cost (such as a disk IO) is minimized.

In this manner, the present embodiment is characterized by a point that a costly process is not performed as much as possible until the stage of acquiring data by leaving only the candidates turned out to be clear in a state in which a noise is included as a solution candidate at an intermediate stage and removing the candidates that can be removed by other constraints as much as possible. Furthermore, the present embodiment is characterized by a point that a process order can be determined to speed up the process from among the relieved constraint conditions that have been delayed.

In a searching process of a structured-document database, because there are many cases in which various index types are mixed or a schema analysis is executed only for a specific structure in a path expression, it can be said that it is effective to delay a process for a specific index type or a specific structure that requires a high cost.

Although a process priority is employed as information for determining the process order, as described later, the process priority is information not only for improving a search accuracy but also for speeding up the searching process as its main purpose. In addition, because the relieved constraint is removed in the last result, it is possible to obtain a strict candidate as a search result.

As shown in FIG. 1, a structured-document searching apparatus 100 is connected to a client 300 via a network 200. The structured-document searching apparatus 100 includes a communicating unit 101, a structured-document storing unit 141, a structure-information storing unit 142, a structure-index storing unit 143, a vocabulary-index storing unit 144, a storage processing unit 110, a search processing unit 120, a result acquiring unit 130, a constraint storing unit 151, and a candidate storing unit 152.

The client 300 transmits a search condition targeted for a structured document to be registered or a registered structured document to the structured-document searching apparatus 100, and receives a search result from the structured-document searching apparatus 100.

The network 200 connects the structured-document searching apparatus 100 and the client 300. Any kind of network configuration, such as the Internet, a wired local area network (LAN), or a wireless LAN, can be applied to the network 200.

The communicating unit 101 receives requests for a variety of processes and a structured document to be registered from the client 300, and transmits a search result to the client 300.

A command received from the client 300 includes a storage command, a search command, and an acquisition command. The storage command is a command for requesting an execution of a process of storing an input structured document. The search command is a command for acquiring a result set using a query language (such as XQuery) as an input. The result set refers to a set of OIDs, which is a search result.

The acquisition command is a command for acquiring actual data of a structured document designated by a user from the result set. At this time, the user can perform a designation of the number of cases to be acquired, such as the number of cases to be acquired from the result set or the whole cases of the result set.

The storage command, the search command, and the acquisition command received by the communicating unit 101 are notified to the storage processing unit 110, the search processing unit 120, and the result acquiring unit 130, respectively.

The structured-document storing unit 141 stores therein a structured document described in XML. A description format of the structured document is explained below.

Figures 2, 3:
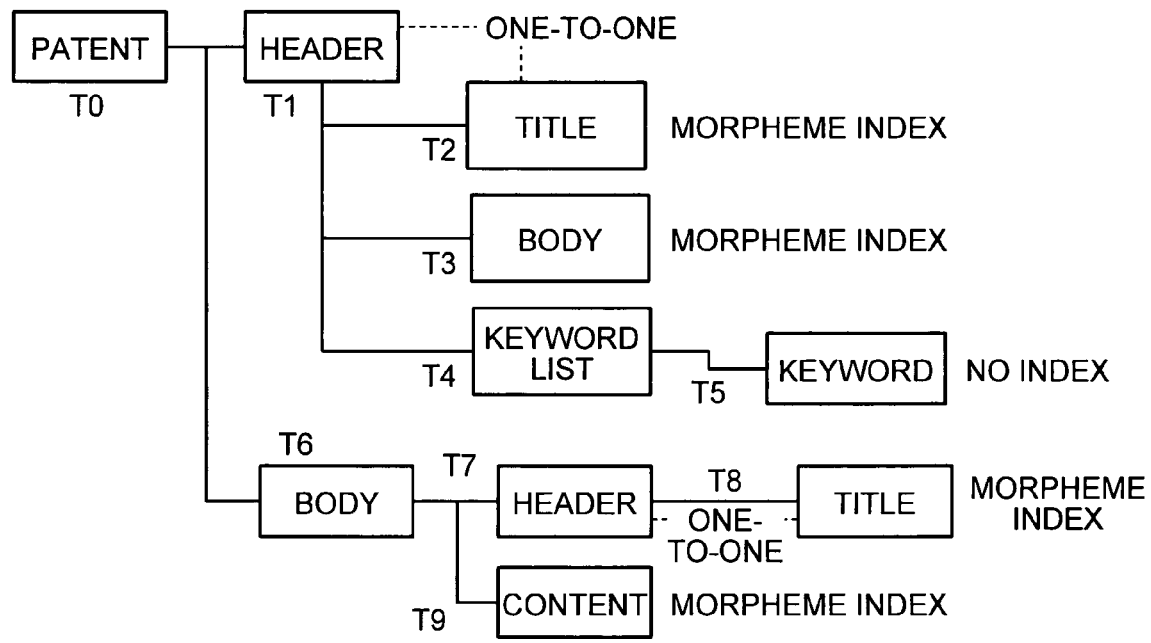
FIG. 2 is a schematic diagram for explaining an example of a structured document described in XML.
FIG. 3 is a schematic diagram for explaining an example of a data structure of structure information stored in a structure-information storing unit.

An example of the structured document in which information on a patent is described in XML is shown in FIG. 2. In XML, a tag is employed to express a structure of a document. The tag includes a start tag and an end tag. By enclosing a structure element of the structured document with the start tag and the end tag, it is possible to clearly describe a break of a character string (a text) in a document and a structure element to which the text belongs in a structural aspect.

In XML, a unit of data defined by a tag is called an element. For instance, the data including a <patent> tag and a </patent> tag and enclosed by both of the tags constitutes a single element.

In the element, it is possible to designate an attribute for attaching additional information such as a possibility of omission and a possibility of repetition. The attribute is set in the start tag in a format like "<element name attribute="attribute value">".

The start tag is described in a format in which the element name is closed by symbols "<" and ">", and the end tag is described in a format in which the element name is closed by symbols "</" and ">". A text representing actual information of the structured document or another element (a child element) is set between the start tag and the end tag. A structure element that does not include a text, such as "<patent DB></patent DB>", can be expressed as "<patent DB/>" as a simplified notation.

The document shown in FIG. 2 takes an element starting from a "patent" tag as a document root, and includes elements starting from "header", "title", "body", "keyword list", and "keyword" as child elements of the document root. For instance, in the element starting from "title", there is a text (character string) saying "XMLDB".

Information obtained by extracting a name and an hierarchical relation of each of the tags and the number of repetitions from the structured document in the XML format is called structure information. Furthermore, a unit of a logical structure constituting the structure information of the structured document is called a structure element. According to the present embodiment, the element, the attribute, and the text described above are the structure elements.

In addition, as shown in FIG. 2, a document ID for uniquely identifying a document in the structured-document storing unit 141 and an element ID for uniquely identifying each structure element in the document are given in each document. It is possible to uniquely identify all of the elements in the structured-document storing unit 141 from information obtained by combining the document ID and the element ID. Hereinafter, the information obtained by combining the document ID and the element ID is called an object ID (OID), and an element identified by the OID is called an object.

The structure-information storing unit 142 stores therein the structure information extracted from the structured document in the XML format described above. The structure-information storing unit 142 is referred to, when a structure of a structured document to be stored in the structured-document storing unit 141 is analyzed by collating it with the structure information.

FIG. 3 shows an example of the structure information expressed using a tree structure.

As shown in FIG. 3, the structure element that is a unit of the hierarchized structure information is set to a node, and a structure ID (hereinafter, "a template ID (TID)") that is an identifier for uniquely identifying a structure element corresponding to the node is given to each node. The structure information is information obtained by extracting only the information representing the structure from a plurality of structured documents. Therefore, for example, even information that can be set a plurality of times in the structured document, such as a node of "keyword" shown in FIG. 2, is distilled to one thing on the structure information.

According to the present embodiment, it is assumed that the schema analysis information is appropriately extracted using statistical information or the like. The schema analysis information refers to information defining the structure of the structured document. In the example shown in FIG. 3, for example, it is shown that a header and a title have one-to-one relationship, i.e., the statistical information indicating that there is definitely one <title> under the <header> is kept as the schema analysis information.

In this case, it is possible to identify an OID by resolving a constraint on the structure with only the TID that is global structure information, without necessarily obtaining the OID by performing an actual data scan. The schema analysis information is effective when performing a structure check with respect to a value obtained from an index. For instance, when the element ID of a title obtained from the index is E3, it is possible to obtain a fact that there exists definitely a header that is a parent element, and the element ID of the header is E2, without performing a data scan.

In addition, as shown in FIG. 3, discrimination information indicating whether a vocabulary index is attached is given to a node having text information. In the example shown in FIG. 3, it is shown that a vocabulary index by a morpheme (a morpheme index) is given to each node of title, body, and content, and discrimination information indicating that the index is not attached is given to a node of keyword.

The type of the vocabulary index is not limited to the morpheme index, but any kind of index, such as an N-gram index and a numerical index, can be used.

The structure-index storing unit 143 stores therein a structure index in which the TID is associated with the OID. By using the structure index, it is possible to acquire an OID list corresponding to the TID.

The vocabulary-index storing unit 144 stores therein a vocabulary index in which a vocabulary ID for identifying a vocabulary included in all structured documents stored in the structured-document storing unit 141 is associated with the OID.

Figure 4:
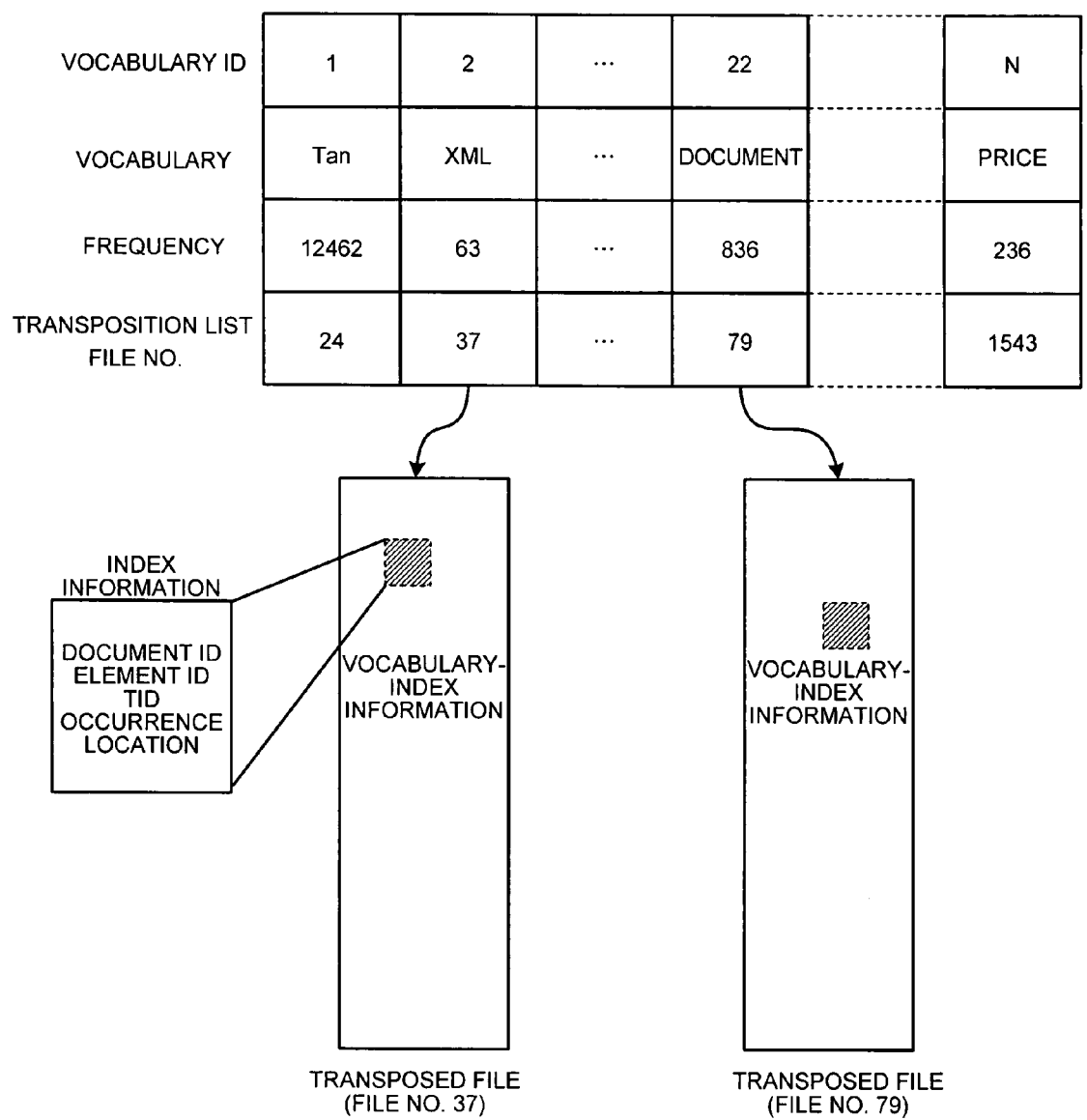
FIG. 4 is a schematic diagram for explaining an example of a data structure of a vocabulary index stored in a vocabulary-index storing unit.

As shown in FIG. 4, the vocabulary-index storing unit 144 stores therein the vocabulary ID that is an identifier of a vocabulary given in ascending order of occurrence of each vocabulary, an occurrence frequency of the vocabulary in the entire structured document, and a vocabulary index associated with a transposed file number. The transposed file number is a number for uniquely identifying a transposed file including information on an element containing a vocabulary corresponding to the vocabulary ID.

An example of a data structure of the transposed file is shown at the bottom of FIG. 4. The transposed file stores therein a TID, a document ID, an element ID, and an occurrence location in associated with each other.

The occurrence location is information indicating a location where the vocabulary corresponding to the transposed file appears in an element of a structured document that is identified by the document ID and the element ID. With the vocabulary index including the transposed file, it is possible to identify an object (element) corresponding to each vocabulary. In addition to the information, it can be configured to add a feature amount such as a hash value calculated from data by a predetermined rule.

The structured-document storing unit 141, the structure-information storing unit 142, the structure-index storing unit 143, and the vocabulary-index storing unit 144 can be configured with any type of storage medium that is commonly used, such as a hard disk drive (HDD), an optical disk, a memory card, and a random access memory (RAM).

The storage processing unit 110 performs a process of storing a structured document and structure information and an index extracted from the structured document. The storage processing unit 110 includes a schema analyzing unit 111, a vocabulary-index generating unit 112, a structure-index generating unit 113, and a registering unit 114.

The schema analyzing unit 111 performs a parsing of a structured document that is text format data acquired from the communicating unit 101, expands a result of the analysis in an object tree format such as a DOM, and extracts each node of a tree structure as characteristic structure information. Hereinafter, the structure information of the tree structure extracted in the above manner is referred to as a structure template.

The vocabulary-index generating unit 112 generates a vocabulary index by dividing a text portion of the structured document into each vocabulary, and registers the generated vocabulary index to the vocabulary-index storing unit 144. As for the method of dividing the vocabulary, a morphologic analysis or an N-gram division can be employed according to a type of the vocabulary index, and a user can specify a method to be used.

The structure-index generating unit 113 acquires an IOD corresponding to a path (TID) analyzed by the schema analyzing unit 111, and registers the acquired IOD to the structure-index storing unit 143 as the structure index.

In a search designating a vocabulary, it is often the case that a process employing a structure index is faster than a process employing a vocabulary index.

Figure 5:
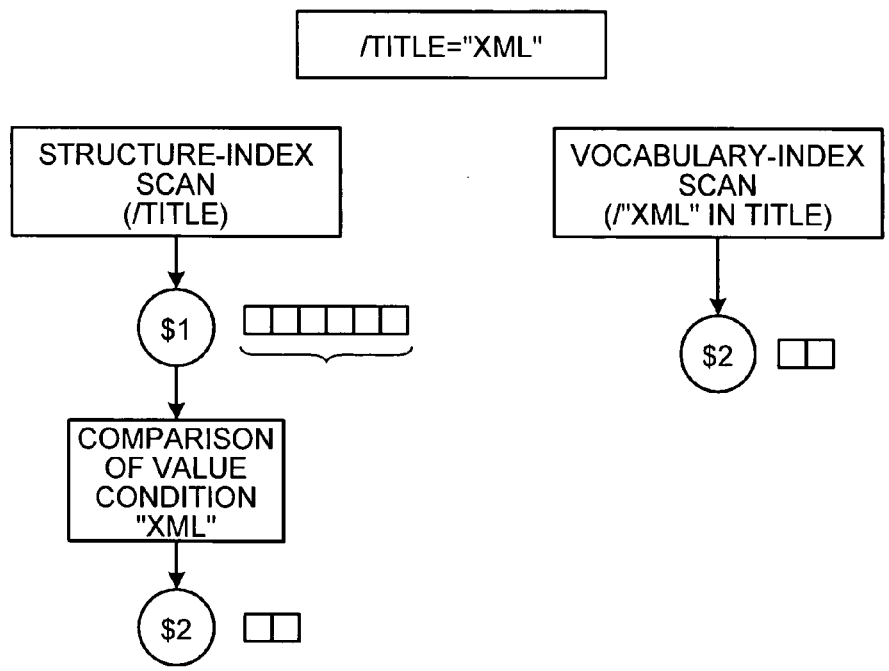
FIG. 5 is a schematic diagram for explaining a comparison between a search by a structure index and a search by a vocabulary index.

In a case in which a search condition "/title="XML"" is designated as shown at the top of FIG. 5, when a structure index is employed, it is necessary to obtain a candidate set of a "/title" {S1} from the structure index, perform a data scan for all candidates, verify whether "XML" is included as a value, and obtain a candidate set {S2} that satisfies the condition.

On the other hand, when a vocabulary index is employed, it is possible to directly obtain the candidate set {S2} that satisfies "/title="XML"", because an index in which a vocabulary is associated with a structure is held. Therefore, the process can be performed only with the index by limiting a search space. For this reason, a search employing the vocabulary index is performed faster than a search employing the structure index.

Furthermore, a problem arising in the structure index is a case in which the number of candidates of the structure index becomes excessive. In general, it is often the case that the number of candidates increases with the structure index, because the structure index has less information to be added as index information compared with the vocabulary index. To prevent the number of candidates from increasing, an increase of information amount of the structure index is performed to speed up the process. For instance, a feature amount with respect to an element value to be a candidate is calculated, and the calculated feature amount is added as the index information.

In addition, it can be configured that the process of creating the structure index by adding the feature amount is performed only for an element corresponding to a TID to which the vocabulary index is not attached, so that a minimum necessary index is generated.

Figure 6:
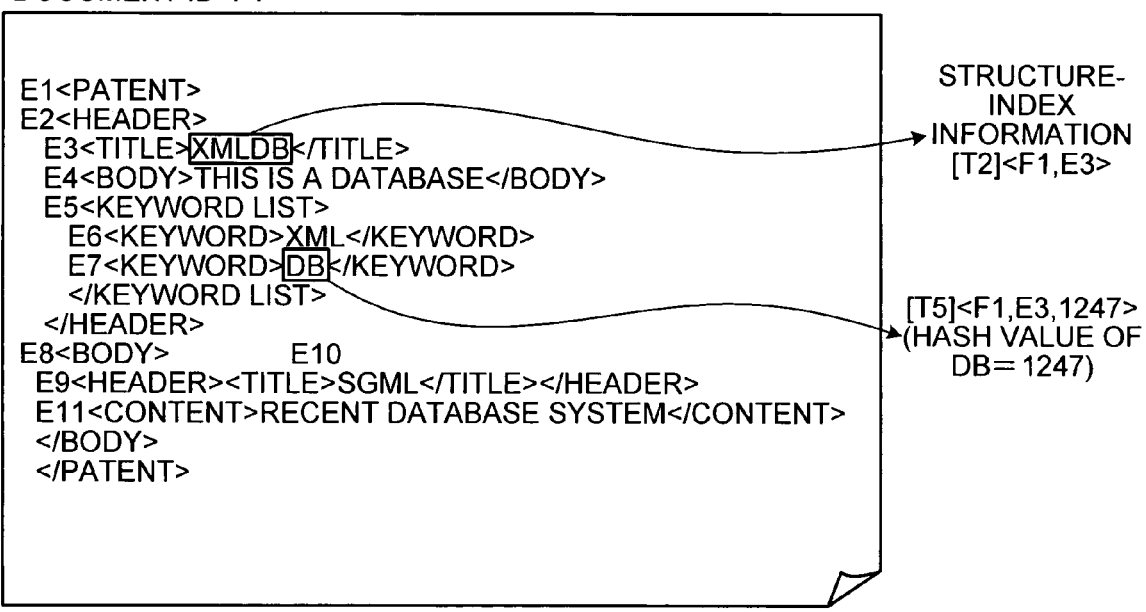
FIG. 6 is a schematic diagram for explaining an example of the structure index.

As shown in FIG. 6, as for TID=T2 (title), a structure index in which an OID formed with a document ID and an element ID is associated with a TID is generated because a vocabulary index is attached. On the other hand, as for TID=T5 (keyword), because the vocabulary index is not attached, a calculation of a hash value is performed, and a structure index is generated by adding the calculated hash value (for example, 1247) as the feature amount.

According to the present embodiment, the user can specify whether to generate the vocabulary index and the structure index for each TID. The user can set a structure index and a vocabulary index, and specify not to attach an index to a specific TID or to attach a numerical index when it is clear that a specific TID often includes a numerical value. In this manner, by enabling the user to specify an index type for each TID according to the data content, a further speed up of the searching process can be realized.

The registering unit 114 attaches parent-child relation and sibling relation to each node expanded in an object tree format, and stores an obtained result in the structured-document storing unit 141. A unique OID is attached to an object corresponding to each node analyzed by the schema analyzing unit 111, and an obtained result is stored in the structured-document storing unit 141.

The search processing unit 120 executes a searching process for an input search condition, following a search command received from the client 300, and generates a result set. The search processing unit 120 includes a condition generating unit 121, a query planning unit 122, and a query executing unit 123.

In this case, it is assumed that the search condition input to the search processing unit 120 is a query language for a structured document, such as XQuery. In addition, in the same manner as a method described in JP-A 2001-147933 (KOKAI), the search processing unit 120 creates a query graph expressing the search condition in a tree structure from an internal format obtained by analyzing the search condition, and obtains a search result by sequentially generating data expressing a combination of possible values (candidate set) of a variable set called a table toward the objective of substantiating all variables included in the query graph. A unit process of generating a table is referred to as an operator, and a result of each operator is maintained in the candidate storing unit 152 (will be described later) as a candidate set.

The condition generating unit 121 performs a syntax analysis (parsing) of the input search condition, and generates a query graph as a result of analysis. At this moment, the condition generating unit 121 attaches a constraint condition with respect to a structure that should be satisfied by each node.

Figure 7:
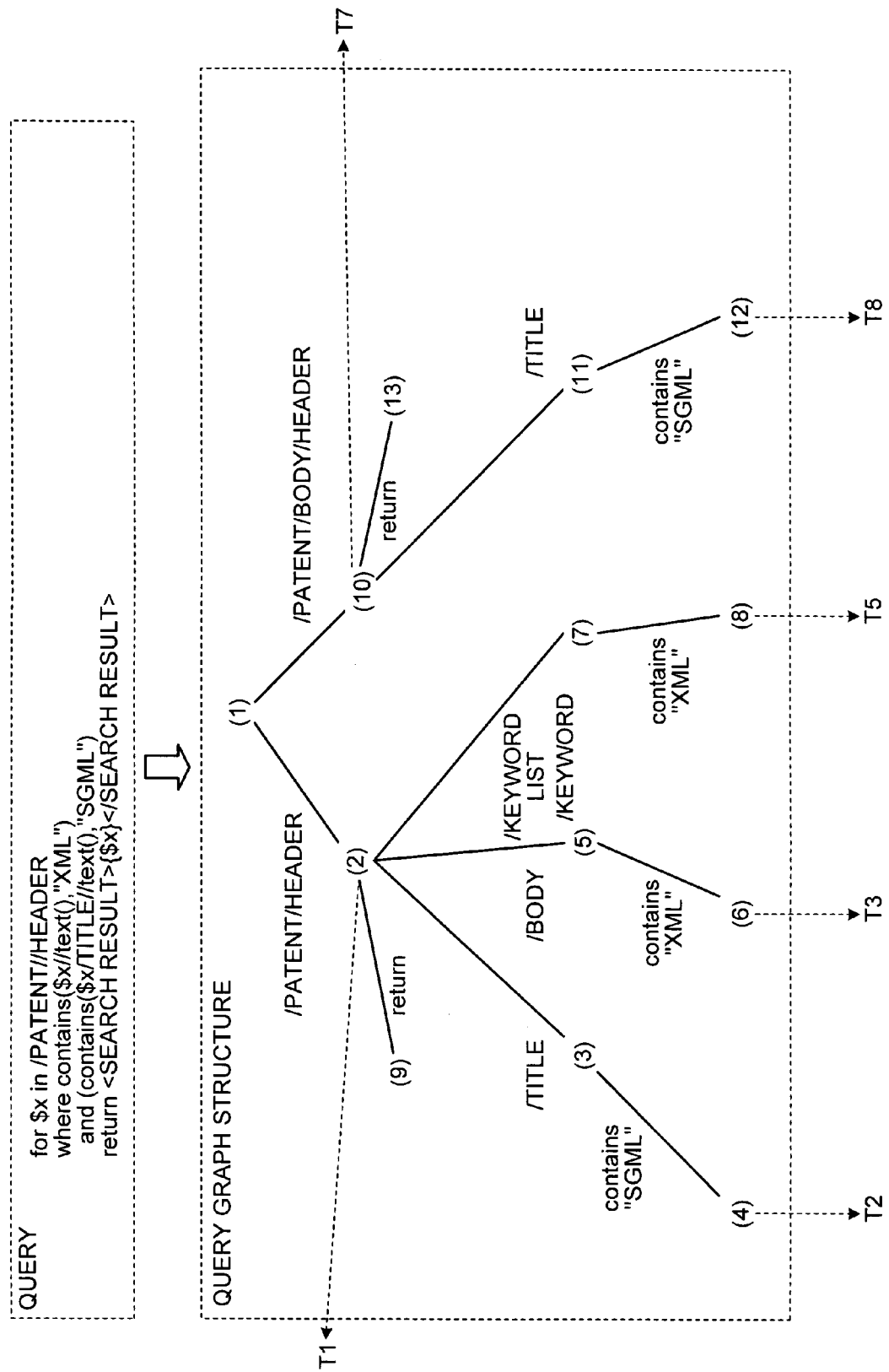
FIG. 7 is a schematic diagram for explaining an example of a query graph.

An example is shown in FIG. 7, in which a search condition indicating "to acquire a header object included in a patent document that includes "XML" in a text of a lower object and "SGML" in a lower text of a lower title object, and to output search result data enclosed by "<search result>" tags" is input as a search condition (query).

As shown in FIG. 7, the query graph is expressed by a tree structure including a node corresponding to each structure element of the structure information. For instance, it is indicated that a header tag is associated with a node 2 of the query graph shown in FIG. 7. Furthermore, for example, it is shown that a title tag is associated with a node 3, and a text element under the title tag is associated with a node 4.

A structure constraint regarding a structure that should be satisfied by the node is attached to each of the nodes of the query graph. For instance, to the node 4 of the query graph shown in FIG. 4, a constraint indicating that it must be a text element under the title tag is attached as the structure constraint. In this case, for the node 4, a structure element of TID=T2 is acquired as a candidate for a corresponding structure element. In the same manner, a structure element of TID=T3 is acquired for a node 6, a structure element of TID=T5 is acquired for a node 8, and a structure element of TID=T8 is acquired for a node 12, as candidates.

When a search condition with respect to a structure element (hereinafter, "a search key"), i.e., a value constraint regarding a value of a text included in the structure element, is present, the search key is associated with a node corresponding to a structure element that becomes a search target of the search key. For instance, "contains "SGML"" is associated with the text element under the title tag corresponding to the node 4, as the search key.

The TID corresponding to a node to which a search key is attached means that it is necessary to determine whether the search key is satisfied. Hereinafter, such type of TID is referred to as a search target TID. In addition, a TID corresponding to a node to be acquired as a search result is referred to as a search result TID. For instance, in the example shown in FIG. 7, T2, T3, T5, and T8 are the search target TIDs, and T1 is the search result TID.

In this manner, the condition generating unit 121 executes a process of narrowing a search space by creating the query graph from collating of the search condition with the global structure information (TID) of the structured document with reference to the data stored in the structure-information storing unit 142. By narrowing the search space, it is possible to skip unnecessary information when scanning the index information, so that the searching process is expected to be executed at a high speed.

Figures 8, 9, 10:
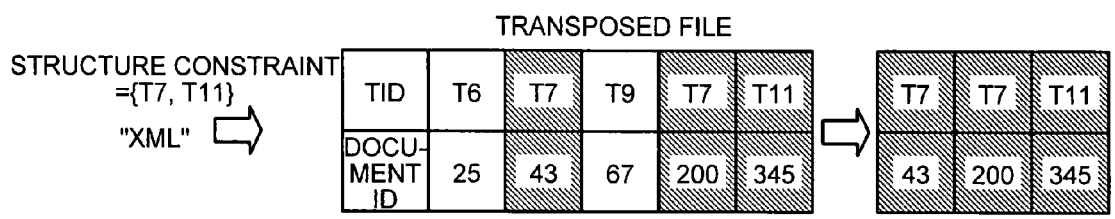
FIG. 8 is a schematic diagram for explaining a process of narrowing candidates.
FIG. 9 is a schematic diagram for explaining an example of a data structure of a constraint condition stored in a constraint storing unit.
FIG. 10 is a schematic diagram for explaining an example of a data structure of a candidate stored in a candidate storing unit.

FIG. 8 is a schematic diagram illustrating a process of narrowing candidates from a candidate set searched by a vocabulary index. As shown in FIG. 8, for example, when the candidate is specified as TID={T7, T11} from a structure constraint of the query graph generated by the condition generating unit 121, it is possible to limit the search space by removing a candidate having a TID other than TID={T7, T11} from the candidate set obtained by the vocabulary index.

The query planning unit 122 creates a plan (a processing order) that minimizes the process cost from the query graph. Specifically, the query planning unit 122 generates a plan by relieving the value constraint and the structure constraint in such a manner that a costly data scan (disk scan) is avoided as much as possible.

The relief of the constraint means a replacement of a constraint that requires a data scan with a constraint that does not require a data scan with which it is possible to acquire solutions without omission although there is a possibility that a candidate that is not actually a solution (noise) is acquired.

The query executing unit 123 performs a searching process following the plan created by the query planning unit 122, and acquires a result set that is a search result. The query executing unit 123 includes a value-constraint processing unit 124 and a second acquiring unit 128.

The value-constraint processing unit 124 performs a process of acquiring a candidate satisfying a value constraint from among constraints included in a query graph. Specifically, the value-constraint processing unit 124 executes an index scan operator, which is a process of acquiring a candidate satisfying the value constraint included in the query graph, using a vocabulary index. The value-constraint processing unit 124 includes a first acquiring unit 125, a third acquiring unit 126, and a candidate generating unit 127.

The first acquiring unit 125 acquires an OID that becomes a candidate according to a constraint in which the value constraint is relieved, by employing a structure index for a TID to which the vocabulary index is not attached. Specifically, the first acquiring unit 125 acquires an OID as a candidate of a search result by acquiring the OID corresponding to a search target TID from the structure-index storing unit 143.

Usually, for a TID without having a vocabulary index, an OID satisfying a search key is acquired by performing a data scan. On the other hand, according to the present embodiment, the first acquiring unit 125 simply acquires an OID corresponding to a TID from a structure index. This makes it possible to acquire a candidate including an actual solution while avoiding a costly data-scan process. A constraint condition for narrowing the candidates to the OID that satisfies the search key is finally attached to the acquired OIDs by the candidate generating unit 127.

The third acquiring unit 126 acquires a candidate satisfying a value constraint using a vocabulary index with respect to a TID to which the vocabulary index is attached. Specifically, the third acquiring unit 126 acquires an OID satisfying the value constraint by acquiring an OID corresponding to a vocabulary ID of a vocabulary included in the search key from the vocabulary-index storing unit 144.

The candidate generating unit 127 generates a candidate of a search result for a single value constraint by combining each of the candidates acquired by the first acquiring unit 125 and the third acquiring unit 126. Specifically, the candidate generating unit 127 associates the search key with respect to the OID acquired by the first acquiring unit 125 as a constraint condition. Subsequently, the candidate generating unit 127 generates the OID that is associated with the constraint condition and the OID acquired by the third acquiring unit 126 as the candidates of the search result.

The constraint condition associated with the candidate is stored in the constraint storing unit 151. As shown in FIG. 9, the constraint storing unit 151 stores therein a constraint ID and a constraint, in an associated manner. The constraint ID is for uniquely identifying the constraint condition, and the constraint indicates contents of the constraint condition.

The candidates of the search result generated by the candidate generating unit 127 are stored in the candidate storing unit 152. As shown in FIG. 10, the candidate storing unit 152 stores therein a candidate with a document ID, a TID, an element ID, a constraint ID, and a process priority associated with each other.

The constraint ID is information for identifying a constraint condition stored in the constraint storing unit 151. When the constraint condition is not attached, the constraint ID is a blank. The process priority is information indicating an order of priority when the result acquiring unit 130 acquires a search result. The process priority takes equal to or larger than "0" and equal to or smaller than "1". Because an acquisition process for a candidate to which a constraint is not attached has a top priority, "1" is set to the process priority of the candidate to which the constraint is not attached.

The constraint storing unit 151 and the candidate storing unit 152 can be formed with any type of storage medium that is commonly used, such as a hard disk drive (HDD), an optical disk, a memory card, and a random access memory (RAM). However, because the constraint storing unit 151 and the candidate storing unit 152 are for storing a candidate or a constraint condition generated as an intermediate data for a searching process, it is desirable to use the RAM or the like that allows a high speed access.

The second acquiring unit 128 performs a process of acquiring a candidate that satisfies a structure constraint from among the constraints included in the query graph. Specifically, the second acquiring unit 128 executes a structure collating operator, which is a process of confirming whether the structure constraint is satisfied, with respect to the candidate generated by the candidate generating unit 127.

In other words, the second acquiring unit 128 acquires an OID that satisfies the structure constraint with respect to an OID included in the candidate generated by the candidate generating unit 127, and that corresponds to a search result TID to be acquired as a search result. Any candidate that cannot acquire a corresponding OID is removed as a candidate that does not satisfy the structure constraint at this point. At this moment, the second acquiring unit 128 acquires an OID that becomes a candidate by a constraint with the structure constraint relieved. Details of the relief of the structure constraint will be described later.

Usually, in a structure collation process, it is often the case that it is strictly checked whether a candidate set obtained from an index satisfies the structure constraint, by performing an actual data access. On the other hand, according to the present embodiment, the structure constraint is relieved by the second acquiring unit 128, and it is possible to acquire a candidate including an actual solution while avoiding a costly data scan process as much as possible.

A constraint condition for narrowing the candidates to the OID that satisfies the structure constraint is finally attached the acquired OIDs by the second acquiring unit 128. The attached constraint condition is stored in the constraint storing unit 151.

The result acquiring unit 130 acquires the specified number of cases of the search result, following an acquisition command received from the client 300, and transmits the acquired search result to the client 300. The number of cases to be acquired with respect to a result set is included in the acquisition command. The number of cases to be acquired can be all of the cases. The result acquiring unit 130 includes an order determining unit 131, a constraint resolving unit 132, and a result generating unit 133.

The order determining unit 131 determines an order of acquiring the search result. Specifically, the order determining unit 131 determines the order in such a manner that a top priority is assigned to a candidate for which the constraint is not relieved and a process is performed in an order of the process priority for the candidates for which the constraint is relieved. At this moment, a candidate included in the same document or a candidate that is present in a closer vicinity in the same document is process in priority. The method of determining the order can be specified by the user.

The constraint resolving unit 132 resolves the constraint condition attached by relieving the value constraint and the structure constraint, and acquires a candidate that satisfies each constraint. For instance, the constraint resolving unit 132 extracts, when candidates with which a search key is associated by relieving the value constraint are present, only the candidates that satisfy the search key from among the candidates, and acquires the extracted candidates as a candidate of the search result.

The result generating unit 133 refers to the candidate of the search result acquired by the constraint resolving unit 132, and generates text data to be returned to the client 300. Specifically, the result generating unit 133 acquires an object in the structured document, which corresponds to the OID acquired as the candidate, from the structured-document storing unit 141, and generates the acquired object as the text data to be returned to the client 300.

Figure 11:
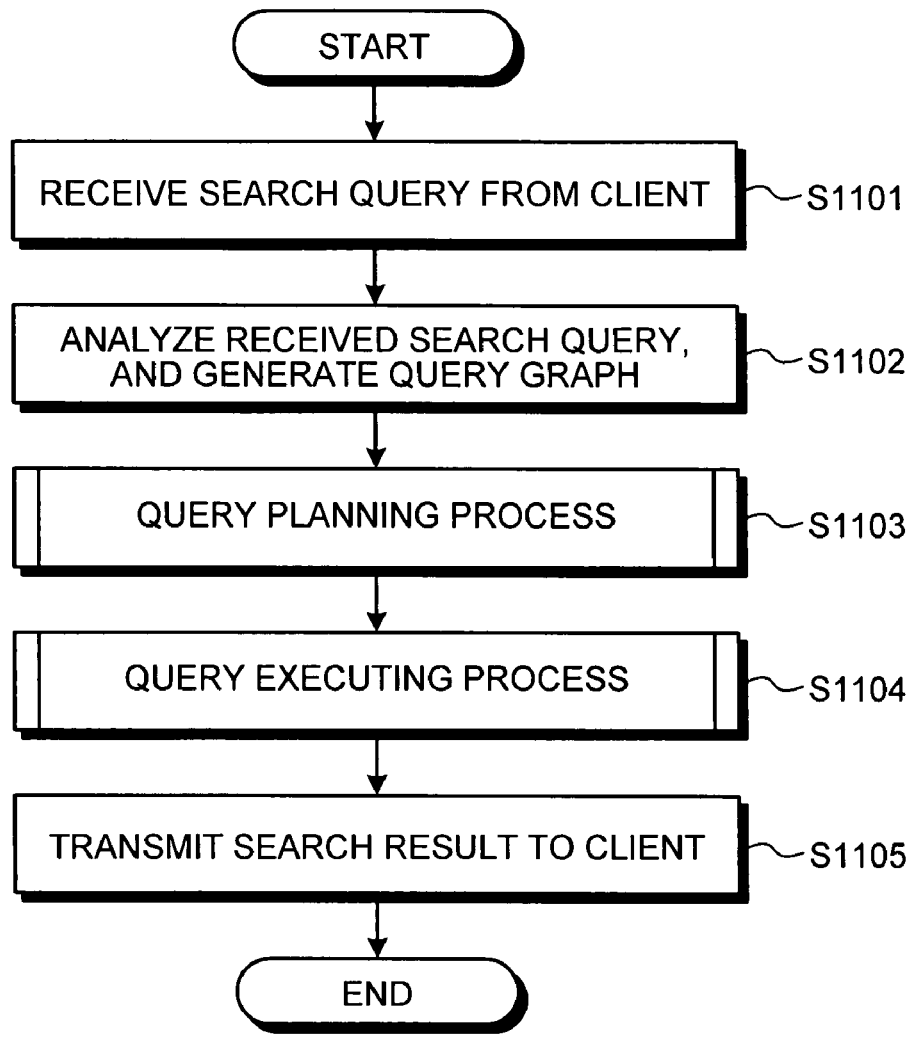
FIG. 11 is a flowchart for explaining an overall flow of a structured-document searching process according to the present embodiment.

A structured-document searching process is explained with reference to FIG. 11, which is performed by the structured-document searching apparatus 100 according to the present embodiment configured as described above. The structured-document searching process means a process in which the search processing unit 120 returns a result set to the client 300 in response to a search command received from the client 300.

First, the communicating unit 101 receives a search condition (search query) from the client 300 (Step S1101). The condition generating unit 121 analyzes the received search query, and generates a query graph (Step S1102).

After that, the query planning unit 122 executes a query planning process of creating a plan that minimizes the cost, by referring to the query graph (Step S1103). Details of the query planning process will be described later.

Subsequently, the query executing unit 123 performs a query executing process of performing a searching process following the created plan (Step S1104). Details of the query executing process will be described later.

The communicating unit 101 transmits a result set that is a search result of the query executing process to the client 300, with which the structured-document searching process is completed (Step S1105).

Figure 12:
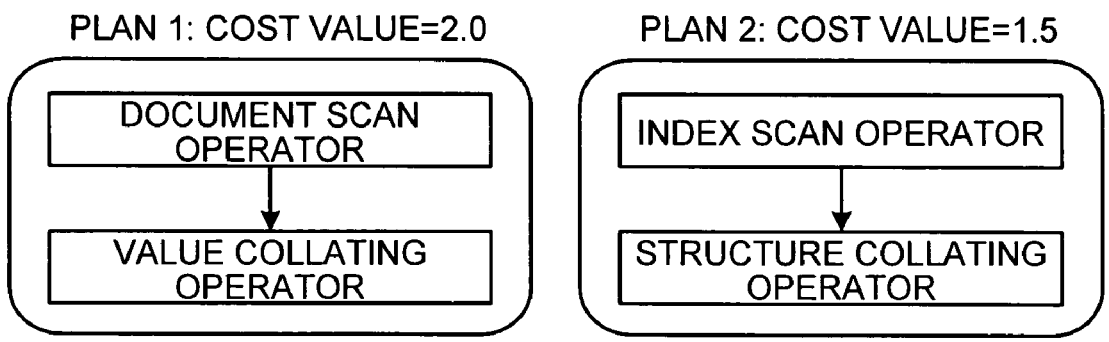
FIG. 12 is a schematic diagram for explaining an example of a plan.

The query planning process performed at Step S1103 is explained in detail below. First of all, an outline of the plan that is considered at the query planning process is explained with reference to FIG. 12.

For instance, in the case of considering a search query such as "//patent[contains(.//text( ), "XML")]", two plans can be considered as the query plan. The first plan is to collate values including "XML" after acquiring texts from a document scan (data scan), and the second plan is to determine, after acquiring post information that is a candidate including "XML" by performing an index scan, whether a "patent" tag is present in a parent element, from a structure collation. The first plan is a traverse from an upper level, and the second plan is a traverse from a lower level.

In general, the second plan causes the lower cost because a process speed decrease as the number of data scans increases. Therefore, it is desired to select the second plan. On the other hand, in view of searching data without omission, it is required that the index information should be attached to all of the structure elements under "patent", to select the second plan.

When the index is not attached to all of the structure elements, there is a possibility that the first plan is selected because the costs of the data scan increases. However, in a situation in which the index is not attached to a certain part of the structure elements, it is efficient to select the second plan. According to the present embodiment, to select the plan efficiently, a relief of the value constraint and a relief of the structure constraint are performed as described above. If the data scan becomes unnecessary by relieving the constraints, the possibility that the second plan is selected becomes high.

The relief of the value constraint means to separate the structure elements to be searched into structure elements to which the index is attached and structure elements to which the index is not attached, and to execute an index scan operator even for the structure elements to which the index is not attached taking them as the one to which an index is attached virtually.

The relief of the structure constraint is generally used, after executing an index scan operator, to reduce a process cost in the structure collating operator for checking whether each candidate satisfies a structure constraint from post information of the index.

A query planning process to select the second plan is explained below, assuming that a search condition is input with which the second plan can be selected. In an actual query planning process, the number of cases including a noise occurred from the relief of the constraints and the number of data scans are calculated from statistical information and the like to count up a process cost, and a plan with the lowest cost is generated from all plans including the first plan and the second plan.

Figure 13:
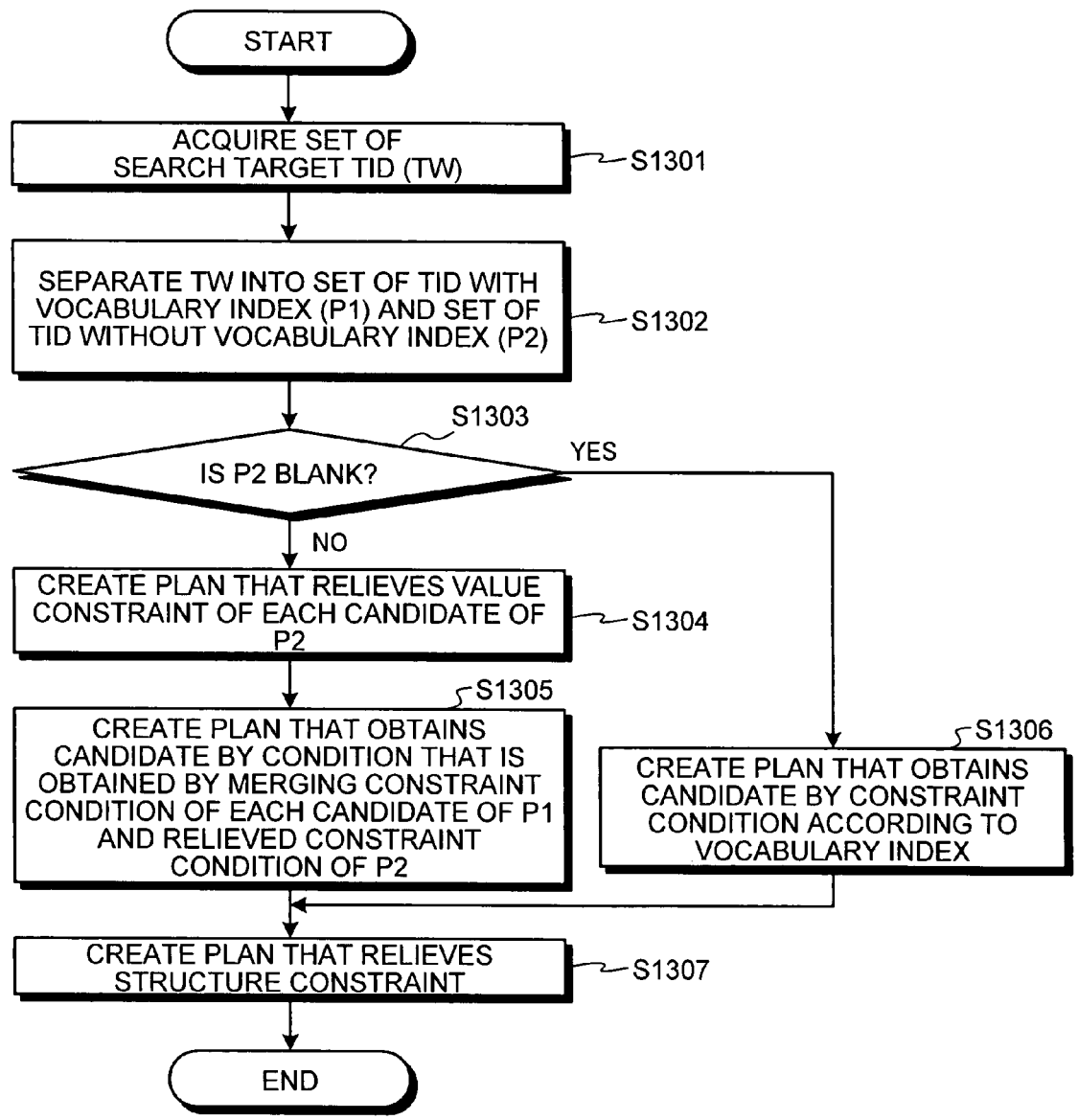
FIG. 13 is a flowchart for explaining an overall flow of a query planning process according to the present embodiment.

A process flow of the query planning process performed at Step S1103 is explained with reference to FIG. 13.

First, the query planning unit 122 acquires a set of search target TIDs (hereinafter, "a TW") to generate a plan for acquiring a candidate that satisfies a value constraint (Step S1301). The query planning unit 122 can acquire the TW by acquiring a TID to which a search key is associated from the query graph.

After that, the query planning unit 122 separates the TW into a set of TIDs having a vocabulary index (hereinafter, "a P1") and a set of TIDs without having a vocabulary index (hereinafter, "a P2") (Step S1302). The query planning unit 122 determines whether the vocabulary index is attached to the TID based on discrimination information provided to each of the TIDs referring to the structure-information storing unit 142.

Subsequently, the query planning unit 122 determines whether the P2 is a blank (Step S1303). When the P2 is a blank, i.e., if the vocabulary index is attached to all of the TIDs (Yes at Step S1303), the query planning unit 122 creates a plan for obtaining candidates according to a constraint condition using the vocabulary index (Step S1306). It is not necessary to relieve the constraint because the candidates are obtained using the vocabulary index without performing a data scan.

On the other hand, when the P2 is not a blank, i.e., it there is a TID to which the vocabulary index is not attached (No at Step S1303), the query planning unit 122 creates a plan for relieving the value constraint of each candidate of the P2 (Step S1304). Specifically, the query planning unit 122 creates a plan for acquiring a candidate that only satisfies the structure constraint, not a plan for acquiring a candidate that satisfies the value constraint by performing a data scan.

The query planning unit 122 creates a plan for acquiring a candidate according to a condition obtained by merging the constraint condition of each candidate of the P1 and the constraint condition that is relieved at Step S1304 with respect to the P2 (Step S1305). With the above procedure, a plan for an index scan operator is generated, which is a process of acquiring a candidate that satisfies the value constraint.

Then, the query planning unit 122 creates a plan for relieving the structure constraint (Step S1307). Specifically, the query planning unit 122 creates a plan for performing a process of simply replacing the corresponding TID in the structure information, not a plan for checking whether the candidate set obtained from the index satisfies the structure constraint by strictly performing an actual data access.

In this manner, because the relief of the structure constraint is a process of unconditionally replacing the TID, there is a possibility that the obtained candidate set indicates an OID that is not actually present.

Figure 14:
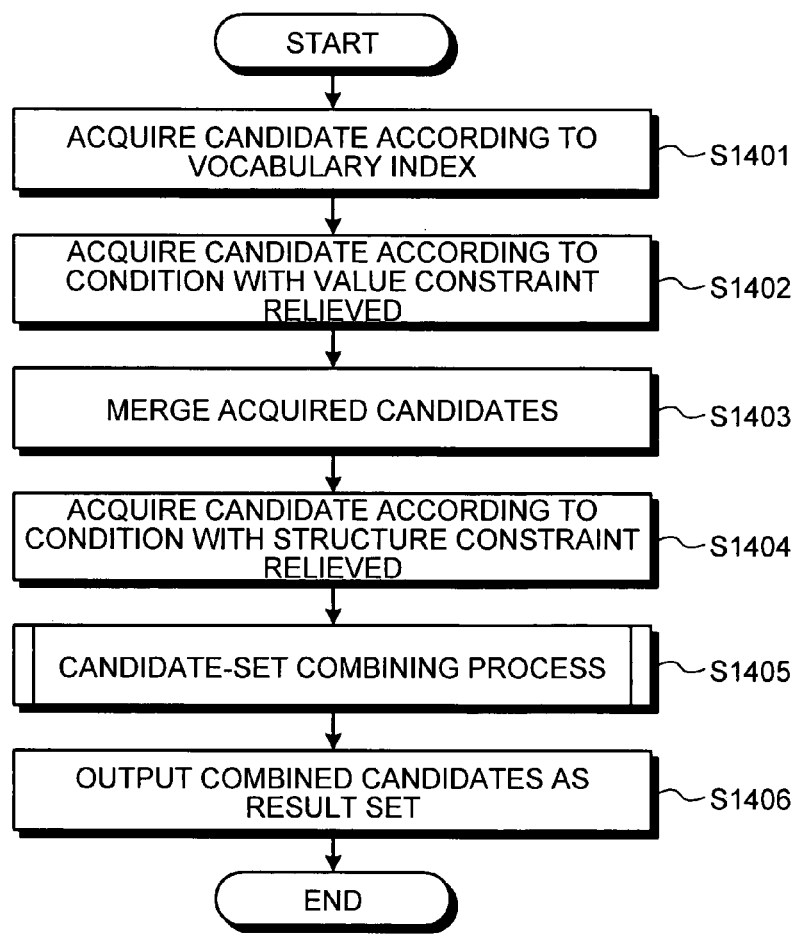
FIG. 14 is a flowchart for explaining an overall flow of a query executing process according to the present embodiment.

The query executing process performed at Step S1104 is explained in detail with reference to FIG. 14.

In the query executing process, a searching process is executed according to the plan created at the query planning process. However, in this example, a searching process is explained in which the value constraint and the structure constraint are relieved and the second plan described above is selected.

First, the third acquiring unit 126 executes a process of acquiring a candidate according to the vocabulary index (Step S1401). Specifically, the third acquiring unit 126 acquires, for a TID to which the vocabulary index is attached, an OID corresponding to a vocabulary ID of a vocabulary included in a search key that is associated with the TID from the vocabulary-index storing unit 144 as a candidate of the search result.

After that, the first acquiring unit 125 executes a process of acquiring a candidate according to a condition with the value constraint relieved (Step S1402). Specifically, the first acquiring unit 125 acquires an OID corresponding to a TID to which the vocabulary index is not attached from the structure-index storing unit 143 as a candidate of the search result.

Subsequently, the candidate generating unit 127 creates a candidate of the search result by merging the candidates acquired by the third acquiring unit 126 and the first acquiring unit 125 (Step S1403). Specifically, the candidate generating unit 127 takes the OID acquired by the first acquiring unit 125 as the candidate by associating the search key as a constraint condition, and takes the OID acquired by the third acquiring unit 126 as it is as the candidate of the search result. With the above processes, a candidate that resolved the value constraint is acquired.

Figure 15:
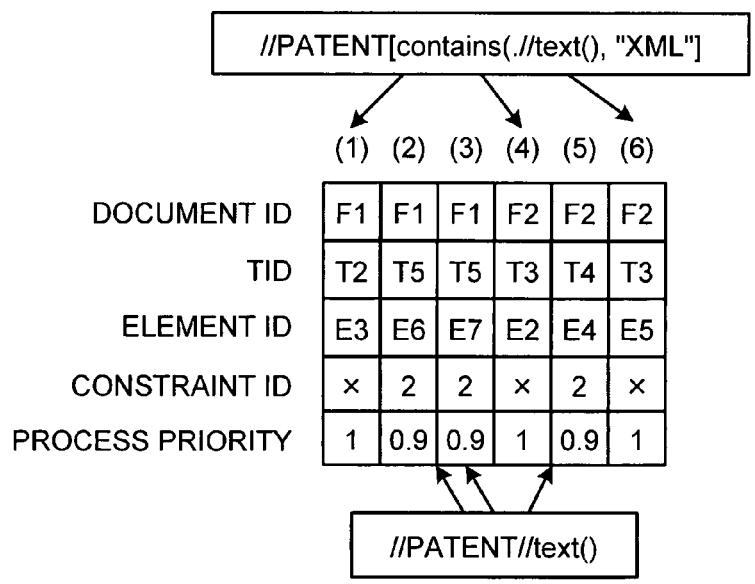
FIG. 15 is a schematic diagram for explaining an example of a candidate obtained by resolving a value constraint.

FIG. 15 is a schematic diagram explaining a relief of the value constraint when the pieces of information as shown in FIG. 2 and FIG. 3 are stored in the structured-document storing unit 141 and the structure-information storing unit 142, respectively, and a search condition indicating "//patent [contains(.//text( ), "XML")]" is input.

For instance, in the structured document having document ID=F1, as shown in FIG. 3, a vocabulary index is attached to TID=T2, while the vocabulary index is not attached to TID=T5. For this reason, from among six candidates, values obtained from the structure index (F1:E6, F1:E7, F2:E4) are obtained for candidates 2; 3, and 5 according to a condition with the value constraint relieved ("//patent//text( )").

Furthermore, as shown in FIG. 15, a constraint ID of a constraint condition that is referred at the time of acquiring the result, constraint ID=2, is attached to the candidates 2, 3, and 5. In this example, in the same way as the constraint shown in FIG. 9, "contains "XML"" is attached as the constraint condition of constraint ID=2.

In addition, a process priority indicating an estimation value of a cost required to implement the attached constraint condition is attached to the candidates 2, 3, and 5 to which the constraint condition has been attached. As for a method of calculating the process priority, for example, a method of setting a smaller value to a process priority closer to a plan of acquiring the result can be applied because the cost is higher when a returning occurs as it is closer to the plan of acquiring the result, considering a progression of the process in the query plan.

In this manner, the constraint condition embedded in the intermediate candidate at the time of executing a query delays a searching process for a candidate that satisfies the constraint condition until a point at which a data acquisition request is received.

Referring back to FIG. 14, the second acquiring unit 128 executes a process of acquiring a candidate according to the condition with the structure constraint relieved (Step S1404). The relief of the structure constraint by the second acquiring unit 128 is explained in detail below with reference to FIG. 16.

When "//header[contains(./title/text( ), "XML")]" is specified as a search condition to the structured document as shown in FIG. 16, element IDs of the candidate set acquired from the vocabulary index are E3 and E13.

With only information such as the acquired element ID, it is possible to acquire the TID of a parent element that should be acquired as a search result (T1 in the example shown in FIG. 3); however, when the schema analysis information is not extracted, it is not possible to obtain the element ID of the parent element. In this case, it is normally required to obtain the element ID of the parent element by a data scan.

According to the present embodiment, the second acquiring unit 128 performs an acquisition of a candidate for which the structure constraint is relieved by delaying the constraint execution and taking the TID only as a value after a transition while maintaining the element ID as an indefinite value (a value before the transition).

The value before the transition means a value of the candidate before resolving the structure constraint, and the value after the transition means a value of the candidate after resolving the structure constraint. Therefore, taking the TID only as the value after the transition means an unconditional replacement of the TID with a TID of a parent element that should satisfy the structure element, although it is not actually checked whether the structure constraint is satisfied.

FIG. 17 is a schematic diagram explaining a relief of the structure constraint when the pieces of information as shown in FIG. 16 and FIG. 3 are stored in the structured-document storing unit 141 and the structure-information storing unit 142, respectively, and a search condition indicating "//header [contains(./title/text( ), "XML")]" is input.

In this case, it is checked whether E3 and E7 have T2 as the TID of the parent element. When E3 and E7 have T2 as the TID of the parent element, the element ID before the transition and the TID after the transition are left as the candidate, without performing a process of obtaining the element ID of the parent element in an accurate manner. Then, "relation[T2, T3] is attached as a constraint condition, and a process of acquiring an accurate candidate is delayed until the point of data acquisition by continuing the process with the element ID left as it is.

In this manner, by relieving the value constraint and the structure constraint as appropriate, it is possible to reduce the cost for the constraint. As a result, it is possible to execute the searching process in a high speed.

When the structure constraint is relieved, a process priority is attached to the candidate, in the same manner as the relief of the value constraint. As for a method of calculating the process priority, for example, a method of setting a large value to a candidate having a small number of stages for obtaining a parent structure or a method of considering a progression of the process in the query plan can be applied.

Referring back to FIG. 14, the query executing unit 123 executes a candidate-set combining process (Step S1405). The candidate-set combining process is a process of combining the intermediate candidates generated during the execution of a plan, including a process of combining candidates with the constraint relieved and an overlap removing process. Details of the candidate-set combining process will be explained later.

After that, the query executing unit 123 outputs the combined candidates as a result set (Step S1406), with which the query executing process is completed.

The candidate-set combining process performed at Step S1405 is explained in detail below with reference to FIG. 18.

First, the query executing unit 123 acquires candidate sets A1 and A2 to be combined (Step S1801). After that, the query executing unit 123 takes out a candidate from each of A1 and A2, and set taken candidates as C1 and C2, respectively (Step S1802).

Subsequently, the query executing unit 123 determines whether the document ID and the TID of C1 and C2 are identical (Step S1803). When the document ID and the TID of C1 and C2 are identical (Yes at Step S1803), the query executing unit 123 further determines whether both C1 and C2 are candidates with the constraint relieved (Step S1804).

When both C1 and C2 are candidates with the constraint relieved (Yes at Step S1804), the query executing unit 123 combines C1 and C2, and carries over constraint relief information for the combined candidate (Step S1805). The query executing unit 123 leaves the combined candidate in the candidate set (Step S1807). Specifically, the query executing unit 123 performs the combining of the candidates as described below.

First, the query executing unit 123 assigns addresses at the time of storing two candidates to be combined in the candidate storing unit 152 when performing an intermediate process to the candidates, respectively.

Figure 19:
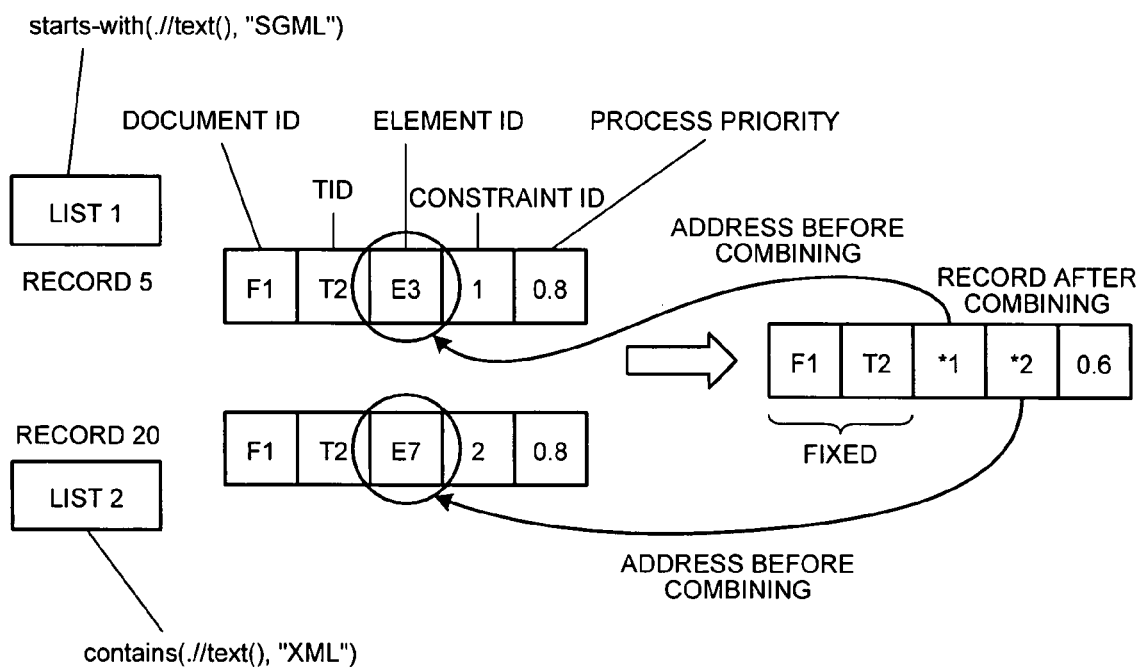
FIG. 19 is a schematic diagram for explaining an example of a process of combining candidates with a relieved constraint.

FIG. 19 is a schematic diagram explaining an example of a combining process for a list 1 and a list 2 that are the candidate sets, a method of specifying a constraint relief condition, and a method of releasing the constraint. The list 1 represents a candidate set for a search key of "start-with(.//text( ), "SGML")", and the list 2 represents a candidate set for a search key of "contains(.//text( ), "XML")".

Although a record 5 that is one of candidates of the list 1 and a record 20 that is one of candidates of the list 2 are candidates for which a constraint is relieved so that the constraint IDs are attached to both records, the document ID (F1) and the TID (T2) of both records are identical. Therefore, even when a combining result is taken with the element ID as an indefinite value, the document ID and the TID are left as they are. At this moment, by leaving addresses of the two records (*1 and *2) that become combining sources, it is possible to perform an implementation of the candidate for which the constraint is relieved.

When releasing the constraint, if the address is recorded, it is possible to perform a constraint release by tracing the address of the branching source. However, the process itself is costly, so that it is desirable to lower the priority for the order of releasing the constraint as much as possible. For this reason, as shown in FIG. 19, the process priority of the combined record is set to a small value.

In this manner, in the case of the combining process, records having identical document ID and TID, which are pieces of information determined until the moment, are combined while leaving the element ID unspecified, and a record for which both IDs are not identical is removed. By performing a combining process even for an unspecified element using the document ID and the TID and filtering candidates for which the IDs are not identical, it is possible to skip a costly process of implementing the element ID.

When none of C1 and C2 is a candidate for which the constraint is relieved at Step S1804 (No at Step S1804), the query executing unit 123 determines whether the element ID is identical (Step S1806).

When the element ID is identical (Yes at Step S1806), a candidate obtained by combining the candidates having identical element IDs is left in the candidate set (Step S1807).

When it is determined that the document ID and the TID of C1 and C2 are not identical at Step S1803 (No at Step S1803), or when it is determined that the element ID is not identical at Step S1806 (No at Step S1806), the query executing unit 123 determined whether all of the candidates in A1 and A2 are processed (Step S1808).

If all of the candidates are not processed (No at Step S1808), the query executing unit 123 repeats the process by acquiring the next candidate (Step S1802).

On the other hand, If all of the candidates are processed (Yes at Step S1808), the query executing unit 123 determines whether all candidate sets are processed (Step S1809). If all candidate sets are not processed (No at Step S1809), the query executing unit 123 repeats the process by acquiring the next candidate set (Step S1801).

On the other hand, if all candidate sets are processed (Yes at Step S1809), the candidate-set combining process is completed.

Figure 18:
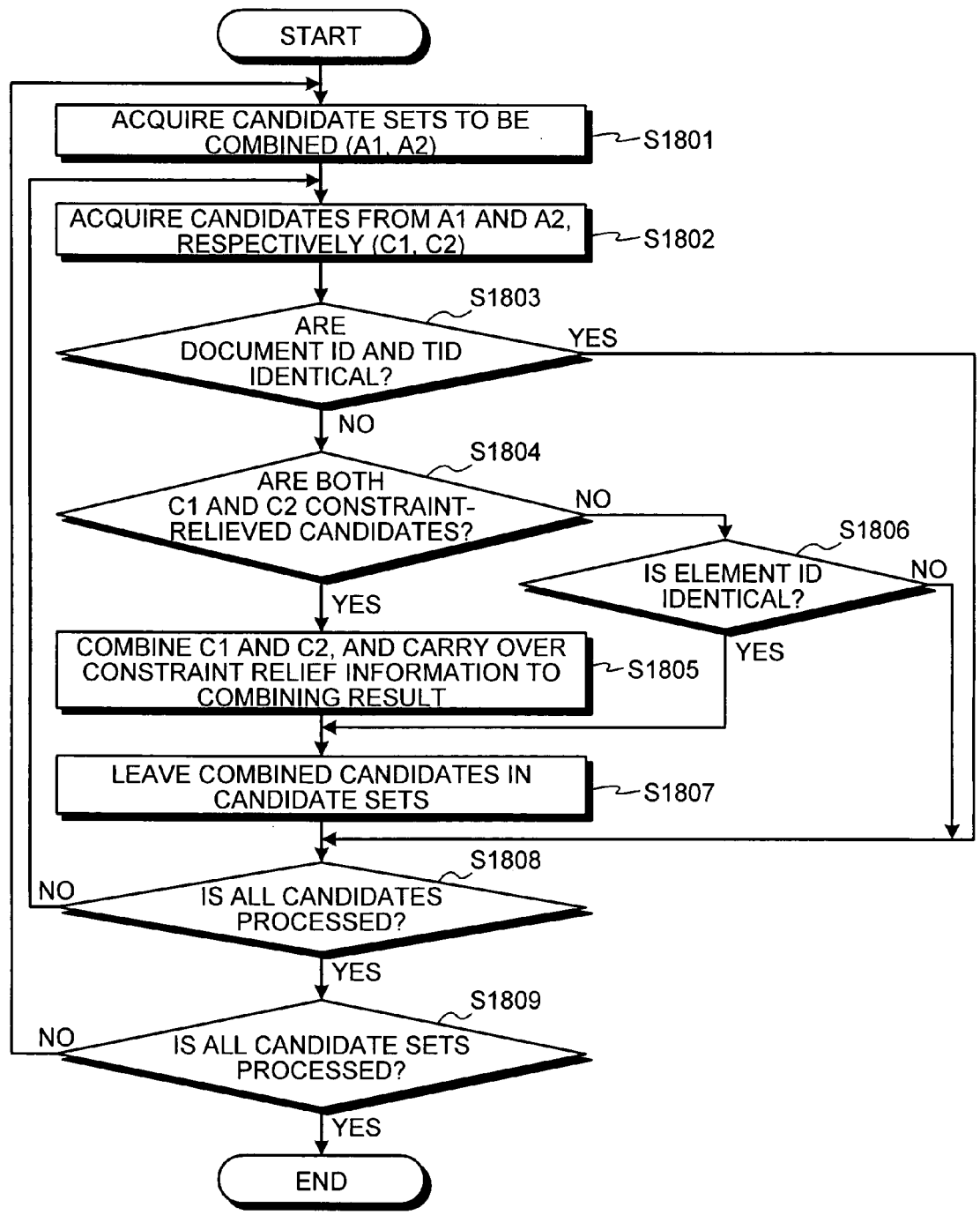
FIG. 18 is a flowchart for explaining an overall flow of a candidate-set combining process.

An example of combining a plurality of constraint-relieved candidates is explained in FIG. 18 as an example a case in which a plurality of constraint conditions are specified in the candidate. As for the case in which a plurality of constraint conditions are specified in the candidate, a case can be considered in which a constraint is further relieved for a candidate for which a constraint is relieved at the time of generating an intermediate candidate. A process of generating a candidate in such case is explained below.

Figure 20:
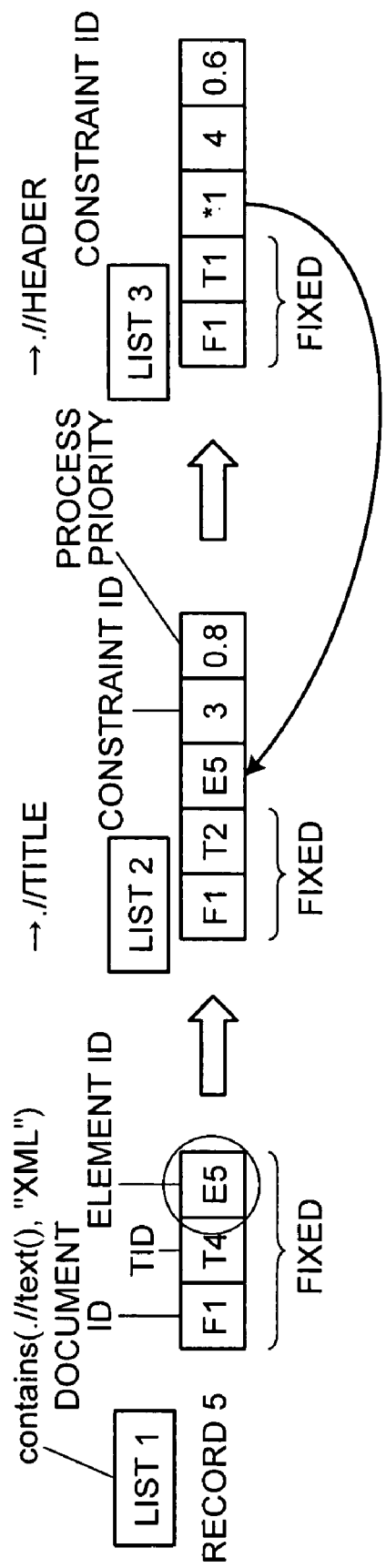
FIG. 20 is a schematic diagram for explaining an example of a process of further relieving a constraint for a candidate with the relieved constraint.

FIG. 20 is a schematic diagram explaining an example of contents of a candidate when the structure constraint is relieved for a list 1, which is a candidate set, and the structure constraint is further relieved.

The list 1 represents a candidate set for a search key of "contains(.//text( ), "XML")". In the example shown in FIG. 20, a structure constraint (.//title) indicating that a title is present in an parent element for the list 1 and a structure constraint (.//header) indicating that a header is further present in the parent element for the list 1 are relieved and added.

In this case, a candidate including a title (TID=T2) in its parent structure is obtained with respect to the list 1; however, a data scan is not performed at this stage, and a constraint condition is attached leaving TID=T2 of a transition destination only. FIG. 21 is a schematic diagram illustrating an example of the constraint condition For the example shown in FIG. 20, a constraint having constraint ID=3 (relation [T, T4]) shown in FIG. 21 is attached, and the constraint ID (=3) is attached to a record of the list 2 that is a candidate set after relieving the constraint.

After that, a candidate further including a header (TID=T1) in its parent structure is obtained; however, at this stage, to carry over the condition of the list 2, the address (*1) and the constraint condition before the transition are attached as the constraint condition. In the example shown in FIG. 21, a constraint having constraint ID=4 (constraint ID=3, relation [T1, T2]) is attached as the constraint condition.

With the above processes, the structured-document searching process by the search processing unit 120 has been explained. In the structured-document searching process, a result obtained by performing the query plan until the end is stored in the candidate storing unit 152. At this stage, the result is information including a noise because the constraint is not released for the candidate obtained from the relieved constraint. The user can estimate an overall number of cases to be acquired because the result set and the number of cases of the result at this stage are returned to the client 300.

The user refers to the result set, and transmits an acquisition command that specifies the number of cases to be acquired from the result set or that specifies to acquire all of the cases to the structured-document searching apparatus 100. Upon receiving the acquisition command, a result acquiring process is executed by the result acquiring unit 130.

The result acquiring process is a process of implementing a candidate for which the constraint is not released, and returning the specified number of cases of the search result to the client 300. A specific example of the result acquiring process is explained below.

First, the order determining unit 131 determines an order of acquiring the result. FIG. 22 shows an example in which five cases of candidates are returned to the client 300 as the result set.

For the result set, for example, when one case is specified as the number of cases of result acquisition by the user, the order determining unit 131 determines to process a candidate set 2201, which includes a candidate 1 having the highest process priority among the candidates, in priority to the other candidate sets.

Furthermore, for instance, when three cases is specified as the number of cases of result acquisition by the user, the order determining unit 131 determines to process candidates 3, 4, and 5, with which candidates included in the same document (document ID=F3) can be collectively processed although the process priority is low (0.7), in priority to the other candidate sets. It is because it can be determined that the dada scan cost can be reduced if the candidates are included in the same document. Similarly, it can be configured in such a manner that candidates having close element IDs in the same document are process in priority to the other candidate sets.

After determining the order, if there is a candidate including a relieved constraint, a process of implementing the constraint is performed by the constraint resolving unit 132.

For instance, it is considered that the candidate for which the value constraint is relieved, as shown in FIG. 19, is implemented. It is assumed that the constraint condition as shown in FIG. 21 is stored in the constraint storing unit 151.

In this case, information on the record 5 of the list 1 is read from the candidate storing unit 152 by referring to the address (*1) of the record after combining, and an implementation of the constraint of the record 5 is performed. Namely, it is confirmed that the OID (<F1, E3>) of the record 5 satisfies the constraint condition of constraint ID=1 "starts-with "SGML"".

Subsequently, by referring to the address (*2) of the record after combining, information on the record 20 of the list 2 is read from the candidate storing unit 152, and an implementation of the constraint of the record 20 is performed. Namely, it is confirmed that the OID (<F1, E7>) of the record 20 satisfies the constraint condition of constraint ID=2 "contains "XML"".

Then, a parent element is traced from the element of OID=<F1, E3>, and element ID of an element with TID=T2 is obtained. In this example, for example, it is assumed that E1 is determined to be the element ID. Furthermore, a parent element is traced from the element of OID=<F1, E7>, and element ID of the element with TID=T2 is obtained. If the element ID is E1, OID=<F1, E1> is determined as a solution candidate.

When there is a candidate that does not satisfy even one constraint in the middle of the constraint release, the process is terminated because it can be determined that the candidate cannot be a solution at the point.

It is considered that a candidate for which the structure constraint is relieved as shown in FIG. 20 is implemented. It is assumed that the constraint condition as shown in FIG. 21 is stored in the constraint storing unit 151.

In this case, information on the list 2 is read from the candidate storing unit 152 by referring to the address (*1) of a list 3 that is a candidate set after combining, and an implementation of the constraint concerning the list 2 is performed. Namely, it is confirmed that the OID=<F1, E5> satisfies the constraint condition of constraint ID=3 "relation [T2, T4]". In this example, it is assumed that element I=E2 that satisfies the constraint condition is acquired. Furthermore, for OID=<F1, E2>, a parent element that satisfies the constraint condition of constraint ID=4, "relation [T1, T2]", i.e., the element ID of a parent element having TID=T1, is obtained. For instance, if E1 is obtained, OID=<F1, E1> is acquired as a solution candidate.

A specific example of the structured-document searching process is further explained below. Hereinafter, it is explained by assuming that the pieces of information shown in FIG. 2 and FIG. 3 are stored in the structured-document storing unit 141 and the structure-information storing unit 142, respectively.

From a condition on the left side of the search condition shown in FIG. 23, a structure constraint of "//header//text( )", i.e., a structure constraint indicating that a structure element having text information is included in any one of structure elements under the "header" is obtained. In this case, [T2, T3, T5, T8] is acquired as the structure constraint from the structure information as shown in FIG. 3. The structure constraint [T2, T3, T5, T8] is a constraint meaning that the solution candidate should be TID=T2, T3, T5, or T8.

As shown in FIG. 3, because there is no vocabulary index for T5, a data scan for a structure collation occurs with a conventional method. According to the present embodiment, a relief of the value constraint is performed in such a case.

FIG. 24 is a schematic diagram for explaining the relief of the value constraint in this example. FIG. 24 shows a search condition obtained by relieving the search condition shown in FIG. 23.

"//header//keyword/text( )" is a portion in which the constraint is relieved corresponding to TID=T5, and a candidate is obtained from the structure index for this portion. For a portion of "//header(title|body)/text( )" corresponding to TID=T2, T3, T8 in which the vocabulary index is present, a candidate is obtained using the vocabulary index as it is.

Figure 25:
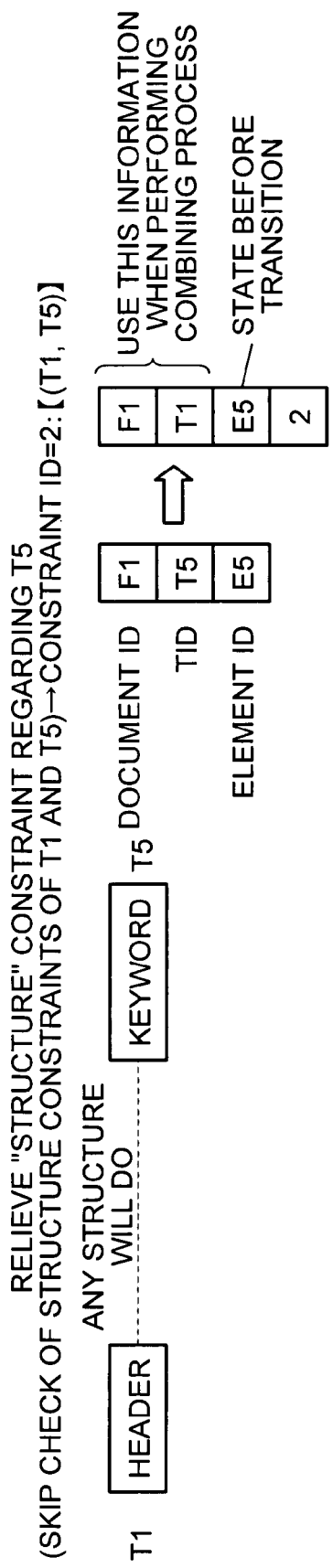
FIG. 25 is a schematic diagram for explaining a relief of a structure constraint.

FIG. 25 is a schematic diagram for explaining the relief of the structure constraint in this example. As shown in FIG. 25, although it is normally necessary to check that T1 is present as a parent element of T5, this check is avoided by performing a relief of the structure constraint by changing the TID only to T1 leaving the element ID as the one before transition.

Figure 26:
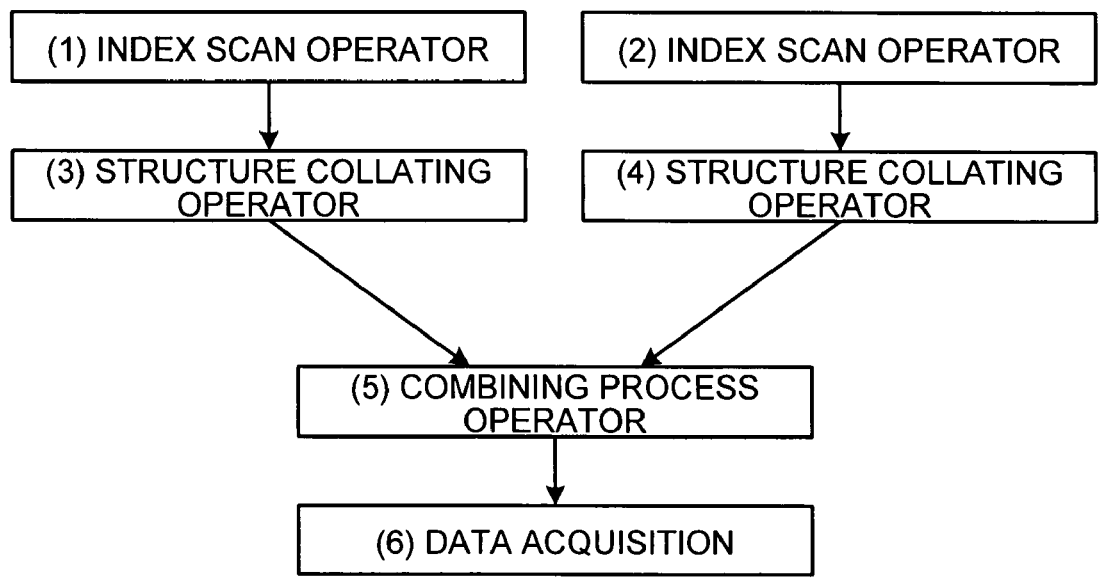
FIG. 26 is a schematic diagram for explaining an example of a created plan.

In this manner, if the relief of the constraint is possible, it becomes easy to select the second plan that traverses from the lower level. A plan is shown in FIG. 26, in which a data acquisition is executed by performing a combining process (a combining process operator) after executing an index scan operator and a structure collating operator.

Usually, an actual data scan is necessary for specifying an element ID that becomes a parent structure from a result obtained by performing the index scan operator at the structure collating operator.

As shown in FIG. 3, when it is proven to be clear that <title> is present under <header> on one to one from the schema analysis information, the element ID (E2) after transition can be specified from the element ID (E3) before transition without performing a data scan for the candidate of TID=T2 that is the structure constraint for this portion.

On the other hand, regarding the other candidates of TID=T3, T5, T8, a data scan is required. According to the present embodiment, the structure constraint is relieved without executing the data scan at the stage of the structure collating operator.

For instance, regarding the structure check from T5 to T1, the TID only is set to T1 after transition while leaving the element ID after transition as an indefinite value. In other words, information after transition is taken as <F1, T1, E5> with respect to information before transition <document ID, TID, element ID>=<F1, T5, E5> at this point. Furthermore, a structure constraint condition of "relation [T1, T5]" is attached as a constraint relief condition.

Because the element ID after transition is indefinite for this candidate, it is a candidate having a possibility of including a noise. However, it is possible to perform a combining process only with the document ID and the TID without the indefinite element ID. For instance, in the case of the tree structure shown in FIG. 3, although T1 and T7 are present as the TID corresponding to "//header", they cannot be the same element from the structural aspect in view of the characteristics of the tree. In other words, there is a case in which the combining process can be performed simply with a template number without obtaining the element ID, an in such a case, it is possible to reduce the data scan cost.

A process of an actual operator is explained below. A behavior of an operator corresponding to the plan shown in FIG. 26 is described below.

(1) Obtain a set including "XML" in //header/text( ) from an index.

(2) Obtain a candidate set including "SGML" in //header/title/text( ) from an index.

(3) Leave a candidate set including a header in its parent element from among the candidate sets obtained at (1) as a candidate.

(4) Leave a candidate set including a header in its parent element from among the candidate sets obtained at (2) as a candidate.

(5) Perform a combining process with the candidates acquired at (3) and (4), and leave candidates having the same ID as a candidate.

(6) Acquire data according to the specified number of cases of the result.

Figure 27:
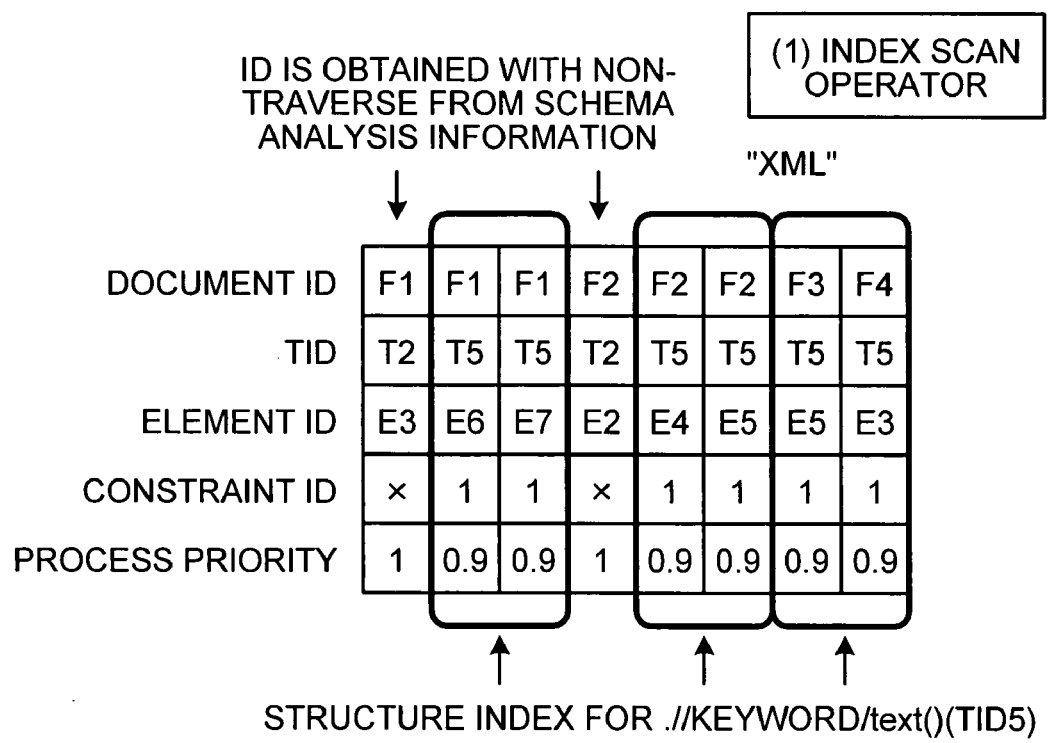
FIG. 27 is a schematic diagram for explaining an example of a candidate obtained with an index scan operator.

An outline of a process of the index scan operator is explained below. FIG. 27 is a schematic diagram explaining an example of a candidate obtained by the index scan operator shown in (1) of FIG. 26.

First, for the structure elements of TID=T2, T3, T8 in which a vocabulary index is present, a candidate is obtained using the vocabulary index. It is ensured that a noise is not included in the solution candidate in this case. Furthermore, a constraint condition is not necessary (X), and "1" is set to the process priority for the above structure elements.

For the structure element of TID=T5 in which there is no vocabulary index, the value constraint is relieved such that a value of "XML" is included, and the candidate set is obtained from the structure index. Because a noise is included in the obtained candidate set in this case, a value other than "1", for example, "0.9" is set to the process priority.

The conditions obtained for the relieved candidates are stored in the constraint storing unit 151. FIG. 28 is a schematic diagram illustrating an example of the constraint storing unit 151 at this point. In this example, because a portion in which the constraint is relieved is a portion indicating "Does the OID include "XML"?", constraint ID=1 is attached to the condition (contains "XML"), and the condition is stored in the constraint storing unit 151.

FIG. 29 is a schematic diagram illustrating an example of a candidate obtained by the index scan operator shown in (2) of FIG. 26. In this case, because a vocabulary index is present in TID=T2, T8 that become the search target and there is no candidate including a noise, a result obtained from the vocabulary index becomes the candidate set as it is.

FIG. 30 is a schematic diagram illustrating an example of a candidate obtained by the structure collating operator shown in (3) of FIG. 26.

First, it is checked whether there is TID=T1 or T7 that is a structure element corresponding to "header" as a parent element with respect to the result obtained at (1), and when TID=T1 or T7 is present, its element ID is obtained. In this case, the process is executed from the one that does not include a noise.

Furthermore, in this example, it is proven to be clear that T1 and T2 are in one-to-one relation from the schema analysis information and a fixed value is assigned as the element ID, the TID having the schema analysis information is process in priority. It is because that, if there is a candidate satisfying any one of the conditions, it can be considered as a solution candidate without releasing other constraints.

For instance, for <F1, T2, E2>, it turns out that the element ID of the header is E1 from the schema analysis information without executing a data scan. In other words, it is possible to obtain <F1, T1, E1> as the solution candidate without performing the data scan.

Also for element ID=E5, because E1 is uniquely determined, a data scan for this portion becomes unnecessary. Similarly, the element ID can be specified for <F2, T2, E2> without performing a dada scan.

However, because there is no schema analysis information for <F4, T3, E3>, the structure constraint is relieved to obtain the element ID that becomes the header. Namely, because the parent element is required to be T1, <F4, T1, E3> is taken as the candidate by replacing only the TID. At the same time, constraint ID=2:relation [T1, T5] is attached as constraint information.

FIG. 31 is a schematic diagram illustrating an example of the constraint storing unit 151 at this point. An example is shown in FIG. 31, in which a constraint condition when the structure constraint is relieved as constraint ID=2 is added.

FIG. 32 is a schematic diagram illustrating an example of a candidate obtained by the structure collating operator shown in (4) of FIG. 26.

In this case, because it is proven to be clear that T5 and T1, T8 and T7 are in one-to-one relation, respectively, from the schema analysis information, the element ID can be specified without performing a data scan. Namely, in this case, it is possible to unconditionally leave E1 as a candidate.

FIG. 33 is a schematic diagram illustrating an example of a candidate obtained by the combining process operator shown in (5) of FIG. 26.

In the combining process operator, a process that leaves candidates having the same OID is performed with respect to the result of the structure collating operator. Also in the combining process operator, the process starts with a candidate that does not include a noise, i.e., a candidate for which the constraint is not relieved, in priority to the other candidates.

As shown in FIG. 33, from among the result of the structure collating operator, the first two candidates <F1, T1, E1> and <F2, T1, E1> are left as a candidate because the OIDs are identical. Regarding the third candidate, because <F3, T1, E5> obtained from the structure collating operator of (3) is a value obtained by relieving the constraint, it is indefinite as the OID. On the other hand, <F3, T7, E1> obtained from the structure collating operator of (4) is a definite value.

Therefore, although the combining process cannot be performed at the OID level, the third candidate is removed because T1 and T7 cannot be the same element in view of the characteristics of the tree structure of the structure information as shown in FIG. 3. Namely, it is possible to determine that the values are different, even without obtaining a strict OID, from global information using the structure template and the like, which makes it possible to narrow the solution candidate.

Regarding the fourth candidate, because it is not possible to perform the above determination at this point, the OID is left as undefined. In this case, because the OID is undefined only for a candidate of <F4, T1, E3>, it is only necessary to resolve the constraint condition of constraint ID=2.

With the searching process described above, three cases of candidates are obtained. However, because all of the data scan processes, which used to be a portion requiring a calculation time in the conventional method, are skipped, the searching process time can be greatly reduced. In addition, the solution candidate set left at this point has a feature that there is no omission of search although there is a possibility of including a noise.

The number of cases of candidates obtained from the searching process is provided to the client 300 as the approximate number of cases of the search result. The user can transmit an acquisition command in which the desired number of cases to be acquired is set, or transmit a search command in which the search condition is further narrowed, based on the number of cases provided to the client 300.

Because the solution candidate obtained from the searching process may include a noise and a definite value of data (OID) is not obtained, it is necessary to obtain a correct value at the result acquiring process. For instance, in the above example, from among the three candidates, F4 includes uncertainty although F1 and F2 are correct solution candidates as the OID. Therefore, when acquiring a definite value of the third candidate, a correct solution is restored from the constraint condition attached at the processes so far.

When the number of candidates exceeds the specified number of cases for acquisition, the process of resolving the constraint may be skipped. For instance, when the user specified two cases as the number of cases for acquisition, the process can be terminated at the time when F1 and F2 are acquired. With this scheme, it is possible to return the search result at a high speed by avoiding the constraint resolving process that causes a heavy processing load.

Figures 34, 35:
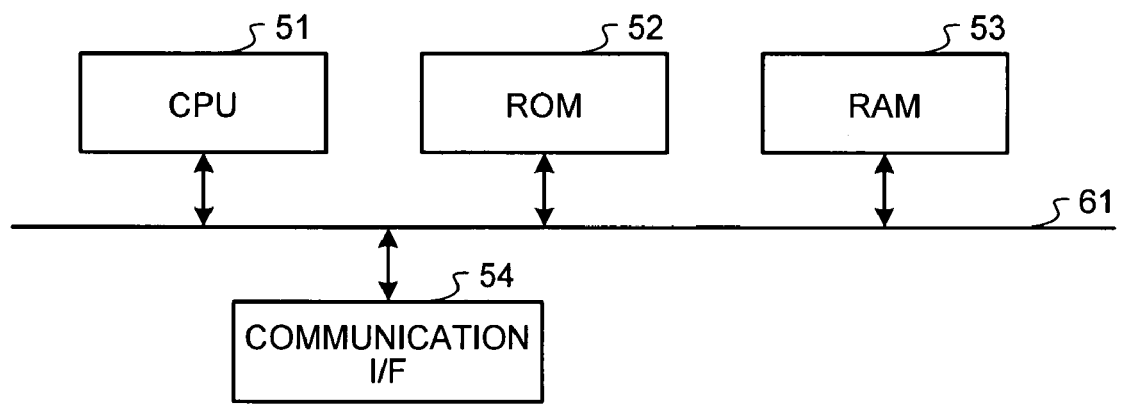
FIG. 34 is a schematic diagram for explaining an example of a candidate obtained at a data acquiring process.
FIG. 35 is a schematic diagram for explaining a hardware configuration of the structure-document searching apparatus according to the present embodiment.

Lastly, (6) data acquisition shown in FIG. 26 is explained with reference to FIG. 34.

When releasing a constraint, a candidate having a high process priority is processed in priority to the other candidates. However, in this example, because the candidate including an indefinite value is <F4, T1, E3> only, the constraint regarding this candidate is released.

For a value with an indefinite OID, a constraint condition is added at the stage of relieving the constraint. In this example, the constraint condition of constraint ID=2 "constraint ID=1, relation [T1, T5]" as shown in FIG. 31 is added.

Because the constraint condition of constraint ID=1 is "contains "XML"", as shown in FIG. 31, the constraint condition for this candidate as a result is "contains "XML" and relation [T1, T5]". To acquire an OID that satisfies the condition, a data scan is performed. Namely, data corresponding to the OID of <F4, T1, E3> is acquired, and it is checked whether "XML" is included in the data. When it is supposedly proven to be clear that "XML" is not included in the data, the process can be terminate at that point.

When "XML" is included in the data, a parent element is traced from the candidate. Then, it is checked whether there is an OID that satisfies TID=T1, and when there is an OID that satisfies TID=T1, a value of the OID is acquired. For instance, if E1 is acquired, <F4, T1, E1> is determined as the solution candidate to be obtained.

In this manner, in the structured-document searching apparatus according to the present embodiment, even when a vocabulary index is not present, it is possible to speed up a searching process by avoiding a dada scan by relieving a structure constraint and a value constraint in a search condition.

Furthermore, when the number of cases of acquiring data is specified, because a candidate for which the constraint is not relieved can be processed in priority to the other candidates, it is possible to greatly improve a response time of a data acquiring process by avoiding a constraint releasing process that causes a heavy processing load.

A hardware configuration of the structured-document searching apparatus according to the present invention is explained with reference to FIG. 35.

The structured-document searching apparatus according to the present invention has a hardware configuration employing an ordinary computer, including a control unit such as a central processing unit (CPU) 51, a storing unit such as a read only memory (ROM) 52 and a random access memory (RAM) 53, a communication interface (I/F) 54 that performs a communication by connecting to a network, an external storage device such as a hard disk drive (HDD) and a compact disk (CD) drive, a display device, an input device such as a keyboard and a mouse, and a bus 61 that connects the constituent units.

A structured-document searching program executed by the structured-document searching apparatus according to the present invention is provided by storing it in a computer-readable recording medium such as a compact disk-read only memory (CD-ROM), a flexible disk (FD), a compact disk-recordable (CD-R), and a digital versatile disk (DVD) as a file of installable format or an executable format.

Furthermore, the structured-document searching program executed by the structured-document searching apparatus according to the present invention can be provided by storing it on a computer that is connected to a network such as the Internet, so that it is downloaded via the network. Moreover, the structured-document searching program executed by the structured-document searching apparatus according to the present invention can be provided or distributed via a network such as the Internet.

In addition, the structured-document searching program executed by the structured-document searching apparatus according to the present invention can be provided as a built-in program in the ROM or the like.

The structured-document searching program executed by the structured-document searching apparatus according to the present invention is configured as a module including the above units (the communicating unit, the storage processing unit, the search processing unit, and the result acquiring unit). As for the actual hardware, the CPU 51 (processor) reads out the structured-document searching program from the recording medium and executes the program, so that each of the units is loaded and generated on a main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for searching a structured document, comprising:

a structured-document storing unit that stores therein structured-document information having a hierarchized logical structure, the structured-document information including an object corresponding to a structure element and an object ID for identifying the object, the structure element being a unit of the logical structure and identified by a structure ID;

a structure-index storing unit that stores therein a structure index in which the structure ID is associated with the object ID;

a vocabulary-index storing unit that stores therein a vocabulary index in which a vocabulary ID for identifying a vocabulary included in the structured-document information is associated with the object ID;

a structure-information storing unit that stores therein structure information on the structure element, the structure information including discrimination information indicating whether the vocabulary index is attached to the structure ID;

a condition generating unit that associates a search key included in an input search condition with the structure ID that is a search target of the search key, generates a hierarchical-type search condition including, as a unit of a hierarchical structure, a search target structure ID that is a structure ID corresponding to the search key and a search result structure ID that is a structure ID to be acquired as a search result for the search condition, the hierarchical-type search condition defining a structure constraint regarding the hierarchical structure to be satisfied between the search target structure ID and the search result structure ID;

a first acquiring unit that acquires, from the structure-index storing unit, the object ID corresponding to the search target structure ID that is associated with the discrimination information indicating that the vocabulary index is not attached to the structure ID from among search target structure IDs included in the hierarchical-type search condition;

a candidate generating unit that associates the search key, as a first constraint condition, with the object ID acquired by the first acquiring unit, and generates a candidate of the search result including the object ID that is associated with the first constraint condition;

a second acquiring unit that acquires the search result structure ID complying with the structure constraint defined in the hierarchical-type search condition, with respect to the search target structure ID corresponding to the object ID included in the candidate generated by the candidate generating unit; and a result acquiring unit that acquires, from the structured-document storing unit, the object corresponding to the object ID satisfying the first constraint condition from among object IDs corresponding to acquired search result structure IDs.

2. The apparatus according to claim 1, further comprising a third acquiring unit that acquires, from the vocabulary-index storing unit, the object ID corresponding to the vocabulary ID of the vocabulary included in the search key that is associated with the search target structure ID, with respect to the search target structure ID that is associated with the discrimination information indicating that the vocabulary index is attached to the structure ID from among the search target structure IDs, wherein the candidate generating unit associates the search key, as the first constraint condition, with the object ID acquired by the first acquiring unit, and generates a candidate of the search result including the object ID that is associated with the first constraint condition and the object ID acquired by the third acquiring unit.

3. The apparatus according to claim 1, wherein the candidate generating unit generates the candidate including the search target structure ID corresponding to the object ID, and the second acquiring unit replaces the search target structure ID included in the candidate with the acquired search result structure ID, and associates the structure constraint with the object ID as a second constraint condition.

4. The apparatus according to claim 1, wherein the candidate generating unit generates the candidate in which a priority indicating an order of priority when the result acquiring unit acquires the object is associated with the object ID acquired by the first acquiring unit, and the result acquiring unit acquires an object corresponding to an object ID having a high priority prior to an object corresponding to an object ID having a low priority.

5. The apparatus according to claim 4, wherein the candidate generating unit generates the candidate by associating a higher priority with an object ID included in the candidate to be acquired earlier and a lower priority with an object ID included in the candidate to be acquired later, from among a plurality of candidates for a plurality of search keys.

6. The apparatus according to claim 3, wherein the second acquiring unit associates a priority indicating an order of priority when the result acquiring unit acquires the object with the object ID that is associated with the second constraint condition, and the result acquiring unit acquires an object corresponding to an object ID having a high priority prior to an object corresponding to an object ID having a low priority.

7. The apparatus according to claim 6, wherein the second acquiring unit associates a higher priority with an object ID having a smaller number of hierarchies from the search target structure ID to the search result structure ID and a lower priority with an object ID having a larger number of hierarchies from the search target structure ID to the search result structure ID.

8. The apparatus according to claim 6, wherein the second acquiring unit associates a higher priority with an object ID included in the candidate to be acquired earlier and a lower priority with an object ID included in the candidate to be acquired later, from among a plurality of candidates for a plurality of search keys.

9. The apparatus according to claim 1, wherein the structured-document storing unit stores therein the object in association with the object ID including a document ID for identifying the structured-document information and an element ID for identifying the object in the structured-document information, the structure-index storing unit stores therein the structure index in which the structure ID is associated with the object ID including the document ID and the element ID, the vocabulary-index storing unit stores therein the vocabulary index in which the vocabulary ID is associated with the object ID including the document ID and the element ID, and the candidate generating unit acquires, when a plurality of search keys combined by an AND condition is included in the hierarchical-type search condition, the object ID for which the document ID included in the object ID and the structure ID corresponding to the object ID are in common from among a plurality of candidates corresponding to each of the search keys, and generates the candidate including acquired object ID.

10. The apparatus according to claim 9, further comprising a candidate storing unit that stores therein the candidate, wherein the candidate generating unit acquires, when the first constraint condition is associated with each of acquired object IDs, the candidate in which the object ID is associated with location information indicating a location where the candidates are stored in the candidate storing unit.

11. The apparatus according to claim 10, wherein the result acquiring unit acquires, when the location information is included in the candidate, the candidate from a location indicated by the location information in the candidate storing unit, and acquires the object corresponding to the object ID included in an acquired candidate satisfying the first constraint condition.

12. The apparatus according to claim 1, wherein the result acquiring unit acquires an object ID that is not associated with the first constraint condition prior to an object ID that is associated with the first constraint condition.

13. The apparatus according to claim 3, wherein the result acquiring unit acquires an object ID that is not associated with the second constraint condition prior to an object ID that is associated with the second constraint condition.

14. The apparatus according to claim 1, wherein the result acquiring unit acquires, when acquiring a plurality of candidates including the object ID that is associated with the first constraint condition, the candidates having objects included in the same structured-document information prior to the candidates having objects respectively included in the different pieces of structured-document information.

15. The apparatus according to claim 3, wherein the result acquiring unit acquires, when acquiring a plurality of candidates including the object ID that is associated with the second constraint condition, the candidates having objects included in the same structured-document information prior to the candidates having objects respectively included in different pieces of structured-document information.

16. The apparatus according to claim 1, further comprising a communicating unit that receives the search condition from a terminal apparatus connected via a network, and transmits number of candidates generated by the candidate generating unit in response to a received search condition to the terminal apparatus.

17. A method of searching a structured document, comprising:

storing structured-document information having a hierarchized logical structure in a structured-document storing unit, the structured-document information including an object corresponding to a structure element and an object ID for identifying the object, the structure element being a unit of the logical structure and identified by a structure ID;

storing a structure index, in which the structure ID is associated with the object ID, in a structure-index storing unit;

storing a vocabulary index, in which a vocabulary ID for identifying a vocabulary included in the structured-document information is associated with the object ID, in a vocabulary-index storing unit;

storing structure information on the structure element in a structure-information storing unit, the structure information including discrimination information indicating whether the vocabulary index is attached to the structure ID;

generating, by associating a search key included in an input search condition with the structure ID that is a search target of the search key, a hierarchical-type search condition including, as a unit of a hierarchical structure, a search target structure ID that is a structure ID corresponding to the search key and a search result structure ID that is a structure ID to be acquired as a search result for the search condition, the hierarchical-type search condition defining a structure constraint regarding the hierarchical structure to be satisfied between the search target structure ID and the search result structure ID;

acquiring, from the structure-index storing unit, the object ID corresponding to the search target structure ID that is associated with the discrimination information indicating that the vocabulary index is not attached to the structure ID from among search target structure IDs included in the hierarchical-type search condition;

generating, by associating the search key, as a first constraint condition, with the object ID acquired at the acquiring, a candidate of the search result including the object ID that is associated with the first constraint condition;

acquiring the search result structure ID complying with the structure constraint defined in the hierarchical-type search condition, with respect to the search target structure ID corresponding to the object ID included in the candidate generated at the generating; and acquiring, from the structured-document storing unit, the object corresponding to the object ID satisfying the first constraint condition from among object IDs corresponding to acquired search result structure IDs.

18. A computer program product comprising a computer-usable medium having computer-readable program codes embodied in the medium that when executed cause a computer to execute:

storing structured-document information having a hierarchized logical structure in a structured-document storing unit, the structured-document information including an object corresponding to a structure element and an object ID for identifying the object, the structure element being a unit of the logical structure and identified by a structure ID;

storing a structure index, in which the structure ID is associated with the object ID, in a structure-index storing unit;

storing a vocabulary index, in which a vocabulary ID for identifying a vocabulary included in the structured-document information is associated with the object ID, in a vocabulary-index storing unit;

storing structure information on the structure element in a structure-information storing unit, the structure information including discrimination information indicating whether the vocabulary index is attached to the structure ID;

generating, by associating a search key included in an input search condition with the structure ID that is a search target of the search key, a hierarchical-type search condition including, as a unit of a hierarchical structure, a search target structure ID that is a structure ID corresponding to the search key and a search result structure ID that is a structure ID to be acquired as a search result for the search condition, the hierarchical-type search condition defining a structure constraint regarding the hierarchical structure to be satisfied between the search target structure ID and the search result structure ID;

acquiring, from the structure-index storing unit, the object ID corresponding to the search target structure ID that is associated with the discrimination information indicating that the vocabulary index is not attached to the structure ID from among search target structure IDs included in the hierarchical-type search condition;

generating, by associating the search key, as a first constraint condition, with the object ID acquired at the acquiring, a candidate of the search result including the object ID that is associated with the first constraint condition;

acquiring the search result structure ID complying with the structure constraint defined in the hierarchical-type search condition, with respect to the search target structure ID corresponding to the object ID included in the candidate generated at the generating; and acquiring, from the structured-document storing unit, the object corresponding to the object ID satisfying the first constraint condition from among object IDs corresponding to acquired search result structure IDs.

* * * * *